United States Patent
Li et al.

(10) Patent No.: US 11,551,083 B2
(45) Date of Patent: Jan. 10, 2023

(54) NEURAL NETWORK TRAINING FROM PRIVATE DATA

(71) Applicant: SoundHound, Inc., Santa Clara, CA (US)

(72) Inventors: Zili Li, San Jose, CA (US); Asif Amirguliyev, Toronto (CA); Jonah Probell, Alviso, CA (US)

(73) Assignee: SoundHound, Inc., Santa Clara, CA (US)

( * ) Notice: Subject to any disclaimer, the term of this patent is extended or adjusted under 35 U.S.C. 154(b) by 341 days.

(21) Appl. No.: 16/716,497

(22) Filed: Dec. 17, 2019

(65) Prior Publication Data

US 2021/0182661 A1    Jun. 17, 2021

(51) Int. Cl.
*G06N 3/08*    (2006.01)
*H04L 67/10*    (2022.01)
*H04L 41/082*    (2022.01)
*G06N 3/04*    (2006.01)

(52) U.S. Cl.
CPC ............. *G06N 3/08* (2013.01); *G06N 3/0454* (2013.01); *G06N 3/084* (2013.01); *H04L 41/082* (2013.01); *H04L 67/10* (2013.01)

(58) Field of Classification Search
CPC ......... G06N 3/082; G06N 3/084; G06N 30/20
See application file for complete search history.

(56) References Cited

U.S. PATENT DOCUMENTS

| | | |
|---|---|---|
| 2018/0089587 A1 | 3/2018 | Suresh |
| 2019/0171978 A1 | 6/2019 | Bonawitz |
| 2020/0125956 A1 | 4/2020 | Ravi et al. |
| 2020/0327206 A1* | 10/2020 | Wang ...................... G06F 30/20 |
| 2021/0034985 A1* | 2/2021 | Vongkulbhisal ....... G06N 3/084 |
| 2021/0097395 A1* | 4/2021 | Ocher .................... G06N 3/082 |
| 2021/0110273 A1 | 4/2021 | Kwon et al. |
| 2021/0150330 A1 | 5/2021 | Sharma et al. |
| 2021/0150407 A1 | 5/2021 | Xu et al. |

(Continued)

FOREIGN PATENT DOCUMENTS

| | | |
|---|---|---|
| WO | 2017066509 A1 | 4/2017 |
| WO | 2018218155 A1 | 11/2018 |

OTHER PUBLICATIONS

Ha Trung et al: Differential Privacy in Deep Learning: An Overview, 2019International Conference on Advanced Computing and Applications (ACOMP),IEEE, Nov. 26, 2019 (Nov. 26, 2019), pp. 97-102.

(Continued)

*Primary Examiner* — Barbara B Anyan

(74) *Attorney, Agent, or Firm* — Dana Legal Services; Jubin Dana

(57) ABSTRACT

Training and enhancement of neural network models, such as from private data, are described. A slave device receives a version of a neural network model from a master. The slave accesses a local and/or private data source and uses the data to perform optimization of the neural network model. This can be done such as by computing gradients or performing knowledge distillation to locally train an enhanced second version of the model. The slave sends the gradients or enhanced neural network model to a master. The master may use the gradient or second version of the model to improve a master model.

14 Claims, 12 Drawing Sheets

(56) References Cited

U.S. PATENT DOCUMENTS

| | | | |
|---|---|---|---|
| 2021/0192357 A1 | 6/2021 | Sinha et al. | |
| 2021/0233550 A1 | 7/2021 | Aihara et al. | |
| 2022/0091837 A1 | 3/2022 | Chai et al. | |
| 2022/0122349 A1 | 4/2022 | Ishii | |

OTHER PUBLICATIONS

Lichao Sun et al: Private Deep Learning with Teacher Ensembles,arxiv. org, Cornell University Library, 201 Olin Library CORNELLUNIVERSITY Ithaca, NY 14853, Jun. 5, 2019 (Jun. 5, 2019).

Neel Guha et al: One-Shot Federated Learning, arxiv.org, Cornelluniversity Library, 201 Olin Library CORNELLUNIVERSITY Ithaca, NY14853, Feb. 28, 2019 (Feb. 28, 2019).

Nicolas Papernot et al: Semi-supervised Knowledge Transfer for DeepLearning from Private Training Data, Nov. 7, 2016 (Nov. 7, 2016).

Reza Shokri et al: Privacy-Preserving Deep Learning, Proceedings of THE22ND ACM SIGSAC Conference on Computer and Communications Security, CCS'15, Jan. 1, 2015 (Jan. 1, 2015), pp. 1310-1321, XP055394102, NewYork, New York, USA.

Zhang Davin et al: A Survey on Collaborative Deep Learning andPrivacy-Preserving, 2018 IEEE Third International Conference on Datascience in Cyberspace (DSC), IEEE, Jun. 18, 2018 (Jun. 18, 2018), pp. 652-658.

Karanbir Chahal, A hitchhiker's guide on distributed training of deep neural networks. Journal of Parallel and Distributed Computing. Mar. 1, 2020;137:65-76.

Ankur Bansal, Privacy preserving back-propagation neural network learning over arbitrarily partitioned data. Neural Computing and Applications. Feb. 1, 2011;20(1):143-50.

Reza Shokri, Privacy-preserving deep learning. InProceedings of the 22nd ACM SIGSAC conference on computer and communications security Oct. 12, 2015 (pp. 1310-1321). ACM.

Robert Kern, NEP 1—A Simple File Format for NumPy Arrays, NumPy, Dec. 20, 2007.

Wei Zhang, Staleness-aware async-sgd for distributed deep learning. arXiv preprint arXiv:1511.05950. Nov. 18, 2015.

Skymind.AI, Distributed Deep Learning, Part 1: An Introduction to Distributed Training of Neural Networks, https://blog.skymind.ai, Nov. 30, 2017.

Seb Arnold, An Introduction to Distributed Deep Learning, seba1511. net, Dec. 15, 2016.

Brendan McMahan, Federated Learning: Collaborative Machine Learning without Centralized Training Data, Google AI Blog, Apr. 6, 2017.

Jim Dowling, Distributed TensorFlow, O'Reilly Media, Dec. 19, 2017.

Distributed training with TensorFlow, TensorFlow Core documentation.

Geoffrey Hinton, Distilling the knowledge in a neural network. arXiv preprint arXiv:1503.02531. Mar. 9, 2015.

Diederik P. Kingma, Adam: A method for stochastic optimization. arXiv preprint arXiv:1412.6980. Dec. 22, 2014.

Qizhe Xie. Self-training with Noisy Student improves ImageNet classification. arXiv preprint arXiv:1911.04252. Nov. 11, 2019.

* cited by examiner

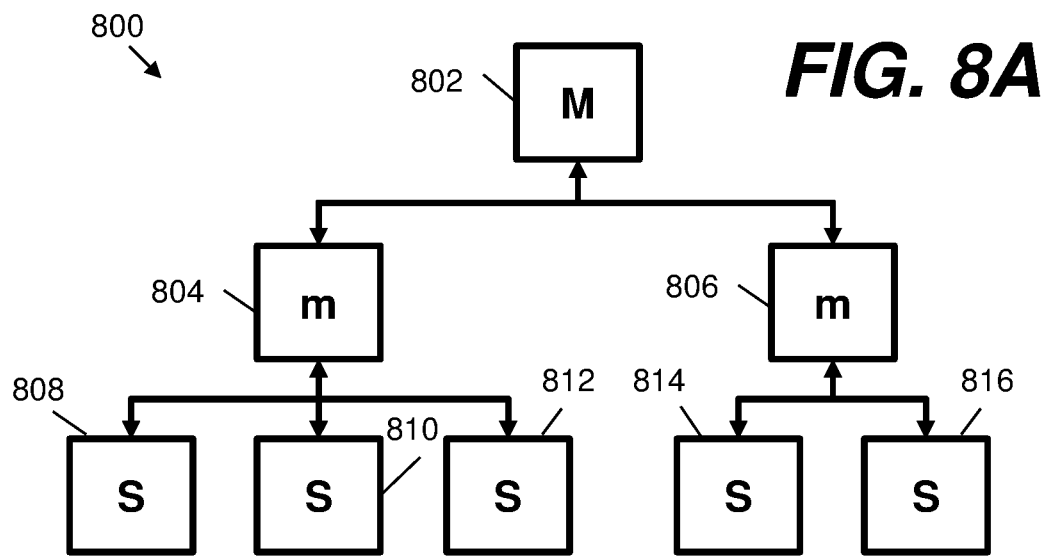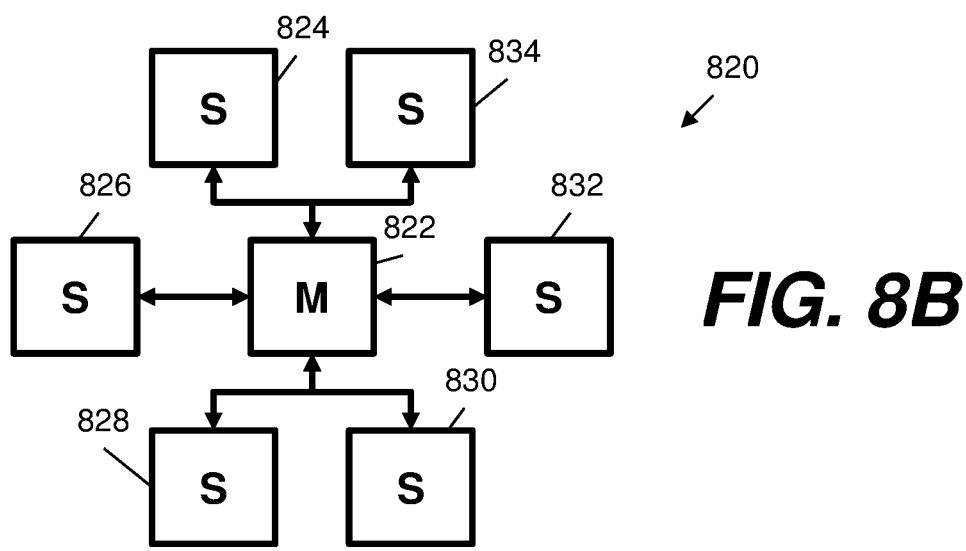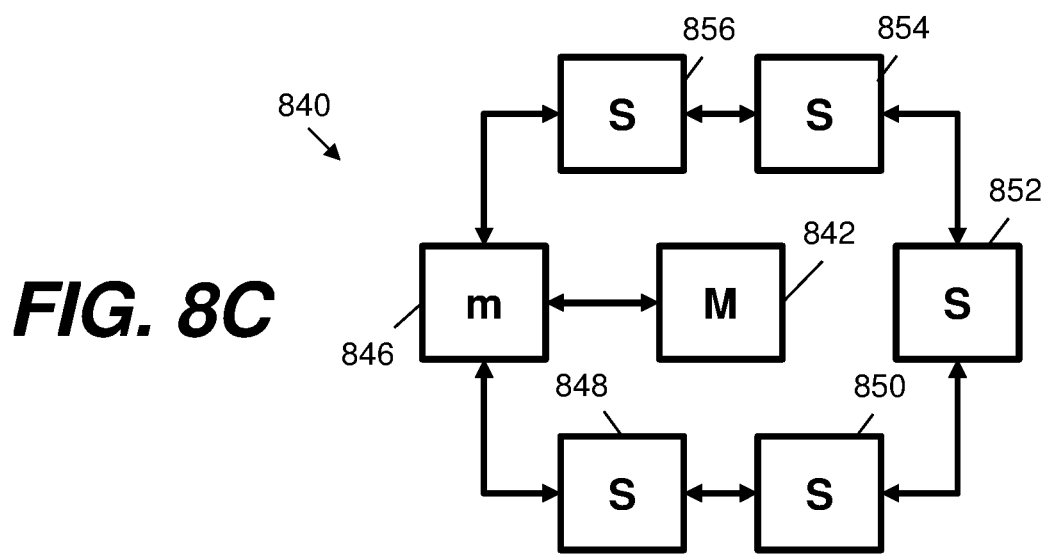

NEURAL NETWORK TRAINING FROM PRIVATE DATA

FIELD OF THE INVENTION

The present technology is in the field of neural network models and, more specifically, in the field of automatic speech recognition to train one or more neural network models for speech processing.

BACKGROUND

Recent advances in computing have raised the possibility of realizing many long sought-after voice-control applications. For example, improvements in statistical models, including practical frameworks for effective neural network architectures, have greatly increased the accuracy and reliability of previous speech processing systems. This has been coupled with a rise in wide area computer networks, which offer a range of modular services that can be simply accessed using application programming interfaces. Voice is quickly becoming a viable option for providing a user interface.

Neural network models have witnessed a heady rate of development over the last few years. The availability of cheap computing power and the parallelism of graphical processing units has enabled large-scale supervised learning systems. These typically consist of a number of neural network "layers" that contain hundreds of thousands or millions of "nodes". Each neural network layer takes an input tensor (e.g. an N-dimensional array) and maps it to a corresponding output tensor using a series of weights that represent the nodes. In certain cases, a layer may also include a bias term, and, following the layer, an activation function may be applied, which typically seeks to limit or clamp the output of the layer in some manner so as to provide a non-linearity. Layers are typically stacked in series such that the neural network model takes an initial input, which is often based on a sensor signal such as an image from a video camera or a recording from a microphone, and generates a final output. The final output may be a classification or a probability vector for a set of detectable features. For example, in speech processing, an acoustic model may output a probability vector indicating which of a set of linguistic features are present in a small portion of speech. The linguistic features may comprise one or more of phonemes, graphemes, characters, letters, words and sub-word units. In speech processing, a sequence of phonemes over time may be determined, and this may then be mapped to a set of words.

Neural network models are commonly trained using an approach called back-propagation. A training set is supplied that consists of pairs of input and output data for a neural network model. The output data is often called a "ground truth" label as it represents what the output should be. In speech processing, this may be one or more hand-labelled linguistic features for a segment of a speech recording. During back-propagation, a neural network model is initialized (e.g. with randomized weights) and then used to make a prediction using a set of input data from the training set (e.g. a so-called "forward" pass). The prediction is compared with the corresponding "ground truth" output data from the training set and an error is computed. The error may form part of a loss function. The error is then back propagated through the neural network model. Typically, the error is propagated according to the derivative of the weights of the neural network model. For example, a gradient of the loss function with respect to the weights of the neural network model may be determined and used to determine an update to the weights that minimizes the loss function. In this case, optimization techniques such as gradient descent, stochastic gradient descent, Adam etc. may be used to adjust the weights. The chain rule and auto-differentiation functions may be applied to efficiently compute the gradient of the loss function, e.g. starting from the output layers and working back through the remaining layers.

There are many challenges when it comes to training a neural network model. First, a large or very large dataset is typically required for accurate predictions. However, only a few well-placed organizations are able to gather such comprehensive datasets. Second, training datasets, especially those relating to audio or video, require large storage capacities and may be difficult to move between devices. Datasets of gigabytes or terabytes are common, which may take days just to move between different storage devices coupled to a common computer. Third, certain sources of data may be inaccessible. For example, few people want their virtual assistants to be constantly recording audio and transmitting this to a remote device, regardless of the impracticality of this approach from a network utility perspective. Fourth, as more neural network models move from research in a laboratory setting into production models that operate in a real-world setting, it becomes apparent that work in the laboratory often does not scale for production systems and the reality of modern information technology architectures.

It is thus desired to provide improved systems and methods for training neural network models. For example, it is desired to develop systems and methods that act to overcome at least some of the challenges above. In a speech processing context, it is desired to provide systems and methods that may be used to improve the performance of automatic speech recognition systems.

SUMMARY OF THE INVENTION

A system and method are provided that improve training of neural network models including improve the performance of automatic speech recognition systems. In accordance with one aspect of the present invention a distributed system for training a neural network model includes a master device that accesses a first data source and a slave device that is remote from the master device. The various aspects of the invention allows training of a neural network model to be split between the master device and the slave device. The master device is thus able to use information that is normally not accessible to the master device. Training is distributed using two versions of the neural network model that are respectively associated with the master and slave devices. By exchanging derived information over a communications network that couples the two devices, privacy and infrastructure separability is maintained.

In accordance with various aspects of the present invention, the slave device is configured to use the first configuration data to instantiate the first version of the neural network model as a teacher model and to instantiate the second version of the neural network model as a student model, the teacher model being used to train the student model. The master device may then be configured to use the second configuration data to instantiate the second version of the neural network model as a teacher model, and to instantiate the first version of the neural network model as a student model, the teacher model being used to train the student model and update the parameters for the first version of the neural network model. In this case, an iterative exchangeable teacher-student configuration enables asynchronous data exchange to improve both versions of the neural network model, without exchanging any private information or requiring access to secure data systems. The teacher-student configuration provides a robust training method that allows information transfer and may be performed on unlabeled data (as well as, or instead of, labelled data), which reduces the need for onerous hand-labelling of data. This may be especially useful in the field of speech recognition where there may be large datasets of audio data but where it is time-consuming to label this data.

In accordance with various aspects of the present invention, the first configuration data includes parameters for the first version of the neural network model and the second configuration data includes parameters for the second version of the neural network model. Hence, the distributed training exchanges weight information as opposed to training samples. This weight information may be orders of magnitude smaller than the training datasets.

In accordance with various aspects of the present invention, the first configuration data includes parameters for the first version of the neural network model and the second configuration data includes gradient data. This provides an alternative method to the teacher-student example (or may be used in combination). This case is better suited to higher frequency exchanges of data during the training process, e.g. synchronous training. It may be suited to night-time training runs where network traffic is reasonably low. The gradient data may be used to update parameters at the master device and so improve the version of the model at that device using data that is private to the slave device.

In accordance with various aspects of the present invention, the master device is communicatively coupled to a first network and the slave device is communicatively coupled to a second network, the first and second networks being heterogeneous and communicatively coupled by one or more untrusted devices. The slave device may form part of a plurality of slave devices, wherein the master device is configured to use second configuration data output by the plurality of slave devices to update parameters for the first version of the neural network model. For example, the master device may be configured to use second configuration data output by the plurality of slave devices to instantiate an ensemble of second versions of the neural network model and to use the ensemble to train the first version of the neural network model. Alternatively, or additionally, the master device may be configured to use aggregate data derived from the second configuration data output by the plurality of slave devices to update parameters for the first version of the neural network model. The master device and the plurality of slave devices may be communicatively coupled according to a defined graph model. In cases where the second configuration data includes gradient data from the plurality of slave devices, the master device may be configured to compare the gradient data from different slave devices to selectively update the parameters for the first version of the neural network model based on the comparison.

In the above aspects with a plurality of slave devices, improvements may be made to neural network models spread over a number of devices. The master device may incorporate information from a plurality of independent heterogenous devices that do not need to be part of a common system or under common control. This provides a flexible and scalable system for implementation in real-world production environments.

In accordance with various aspects of the present invention, the master device is communicatively coupled to a second data source that is inaccessible by the slave device, and wherein the master device is configured to train the first version of the neural network model using data from the second data source. This may be the case for the teacher-student examples described above. The second data source may be a large master data source. Hence, large-scale training may be performed at one site (e.g. the site where a large dataset is available), yet the neural network model may still be improved using one or more smaller private slave datasets available at the set of slave devices.

In accordance with various aspects of the present invention, the slave device includes at least one processor to execute a binary executable stored in memory, wherein the executed binary executable is configured to load the first configuration data and instantiate a second version of the neural network model independently of the master device. The executed binary executable may be configured to output the second configuration data and to control transmission to the master device. A binary executable may provide an efficient container that may be distributed to the slave devices (e.g. either by non-transitory media or transmitted data). The binary executable may be configured using the first configuration data. This allows the slave devices to be relatively "dumb"—all they need do is run the executable to implement the method. This avoids the need for complex layers of (pseudo) virtualization and control. Each slave device can also be managed independently.

In accordance with various aspects of the present invention, the neural network model forms part of a speech recognition pipeline and the first data source stores audio data. In this case, the slave device may be configured to augment the audio data from the first data source with audio noise. The present aspects of the present invention are well-suited to the challenges of automatic speech recognition, where the audio datasets tend to be large and difficult to transmit between devices. Audio datasets often contain confidential information and need to be kept private. This makes training of neural network models difficult, and these difficulties are reduced with the present systems and methods.

In accordance with various aspects of the present invention, the first configuration data includes hyperparameters for the neural network model and parameters for the first version of the neural network model. The hyperparameters may include one or more of: an architecture definition for the neural network model; a number of nodes for one or more layers in the neural network model; a set of node definitions indicating one or more of a node type and a node connectivity; a set of activation function definitions; and one or more cost function definitions. The parameters may include one or more of: weight values for one or more connections between nodes of the neural network model; weight values for one or more inputs to the neural network model; weight values for one or more recurrent paths in the neural network model; and bias values for one or more nodes of the neural network model.

In accordance with various aspects of the present invention, the second configuration data may include gradient data and the master device may be configured to weight the gradient data based on an age of the second configuration data. In aspects where the second configuration data includes gradient data, the master device may be configured to compare the gradient data from the second configuration data with gradient data determined using the first version of the neural network model and to selectively update the parameters for the first version of the neural network model based on the comparison. In this case, the tuning of the neural network model at the master device may be controlled and an effect of adjusting with stale, out-of-date or otherwise unsuitable data may be reduced.

According to another aspect of the present invention, a method of training a neural network model comprising: receiving, at a slave device, first configuration data for the neural network model from a master device, the master device being remote from the slave device, the master device comprising a first version of the neural network model; instantiating, at the slave device, a second version of the neural network model using the first configuration data; training, at the slave device, the second version of the neural network model using data from a first data source, the first data source being inaccessible by the master device; and outputting, at the slave device, second configuration data for the neural network model based on the trained second version of the neural network model, wherein the master device is configured to use the second configuration data to update parameters for the first version of the neural network model. This aspect may provide improvements to the slave device. For example, the slave device does not need to determine initial model parameters as these may be provided in the first configuration data. The slave device may also take advantage of pre-training or other collective training that updates parameters at the master device, and then those parameters are transmitted down to the slave device as the first configuration data. The slave device may also keep the first data source private and secure, yet improve its version of the neural network model through collective training.

In accordance with various aspects of the present invention, instantiating includes instantiating, at the slave device, the second version of the neural network model as a student model and instantiating, at the slave device, the first version of the neural network as a teacher model; training includes, at the slave device, using the teacher model to train the student model; and the second configuration data includes parameters for the trained student model. In these aspects, the first configuration data may include parameters for the first version of the neural network model and a neural network architecture definition for the second version of the neural network model. The first configuration data may also include parameters for the first version of the neural network model; where the student model and the teacher model are instantiated using the parameters for the first version of the neural network model such that the second version of the neural network model includes a copy of the first version of the neural network model; and during training the parameters of the teacher model are fixed and the parameters of the student model are trainable. This provides a teacher-student training framework that allows the slave device to easily improve its version of the neural network model using data from the master device. It also allows the slave device to update its version of the neural network model using large unlabeled datasets (e.g., as well as, or instead of, labelled data).

In accordance with various aspects of the present invention, the first configuration data includes parameters for the first version of the neural network model, the second version of the neural network includes a trainable copy of the first version of the neural network model that is instantiated using the parameters for the first version of the neural network model, and the second configuration data includes gradient data that is generated during the training. In this case, the slave device is able to train its version of the neural network model using a local and secure data source, yet also exchange data that may be used to indirectly improve its version of the neural network model via the first configuration data.

In accordance with various aspects of the present invention, the method is iterated to tune the parameters of the first and second versions of the neural network model.

In accordance with various aspects of the present invention, the method includes loading, at the slave device, a binary executable; and executing, using at least one processor of the slave device, the binary executable to implement at least the instantiating, training and outputting steps. The binary executable may include the first configuration data. The binary executable allows the slave device to simply execute the method without needing complex control overheads.

According to another aspect of the present invention, a method of training a neural network model includes: generating, at a master device, first configuration data for the neural network model based on a first version of the neural network model; sending, from the master device, the first configuration data to a slave device, the slave device being remote from the master device and having access to a first data source that is inaccessible by the master device; receiving, at the master device, second configuration data for the neural network model from the slave device, the second configuration data being based on a second version of the neural network model instantiated at the slave device, the second configuration data being generated at the slave device following training on data from the first data source; and updating parameters for the first version of the neural network model based on the second configuration data. This aspect allows the master device to improve its version of the neural network model using training data that it cannot access.

In accordance with various aspects of the present invention, the second configuration data includes parameters for the second version of the neural network model following training; the updating includes: instantiating the second version of the neural network model as a teacher model using the second configuration data, instantiating the first version of the neural network model as a student model, and training the student model using the teacher model to update the parameters for the first version of the neural network model. This provides a useful way to update the first version of the neural network model using the parameters of one or more second versions of the neural network model.

In accordance with various aspects of the present invention, the receiving includes receiving second configuration data from a plurality of slave devices, and the updating includes: instantiating an ensemble of second versions of the neural network model as an ensemble of teacher models, and using the ensemble of teacher models to train the student model. The first version of the neural network model may thus be improved using private data from a large variety of heterogeneous devices.

In accordance with various aspects of the present invention, the first configuration data includes parameters for the first version of the neural network model and the second configuration data includes gradient data and the updating includes using the gradient data to update the parameters of the first version of the neural network model.

In accordance with various aspects of the present invention, training, at the master device, the first version of the neural network model using data from a second data source, the second data source being inaccessible by the slave device. The method may be iterated to tune the parameters of the first and second versions of the neural network model.

According to another aspect of the present invention, a slave device includes: a storage device to store parameter data for a second version of a neural network model; a memory to store computer program code configured to implement a distributed training operation; a network interface to communicate data with a master device, the master device being remote from the slave device and comprising a first version of the neural network model; a storage interface to communicate with a first data source, the first data source being inaccessible by the master device; and at least one processor, the at least one processor being configured to execute the computer program code stored in memory to: receive, via the network interface, first configuration data for the neural network model from the master device; instantiate the second version of the neural network model using the first configuration data; perform a training operation to train the second version of the neural network model using data from the first data source obtained via the storage interface; update the parameter data in the storage device based on the training operation; and output, via the network interface, second configuration data for the neural network model based on data resulting from the training operation, wherein the master device is configured to use the second configuration data to update parameter data for the first version of the neural network model. The slave device may provide advantages similar to those discussed for other aspects above.

According to another aspect of the present invention, a master device includes: a storage device to store parameter data for a first version of a neural network model; a memory to store computer program code configured to implement a distributed training operation; a network interface to communicate with a slave device, the slave device being remote from the master device; and at least one processor, the at least one processor being configured to execute the computer program code stored in memory to: generate first configuration data for the neural network model based on the first version of the neural network model; send, via the network interface, the first configuration data to a slave device, the slave device having access to a first data source that is inaccessible by the master device; receive, via the network interface, second configuration data for the neural network model from the slave device, the second configuration data being based on a second version of the neural network model instantiated at the slave device using the first configuration data, the second configuration data being generated at the slave device following training on data from the first data source; and update the parameter data for the first version of the neural network model based on the second configuration data. The master device may provide advantages similar to those discussed for other aspects above.

According to other aspects of the present invention, a non-transitory computer-readable storage medium may be provided that stores instructions which, when executed by at least one processor, cause the at least one processor to perform one of the aforementioned methods.

BRIEF DESCRIPTION OF THE DRAWINGS

FIGS. 8A, 8B and 8C show different graph configurations for an embodiment of the invention distributed training system.

DETAILED DESCRIPTION

Introduction

Figure 1:
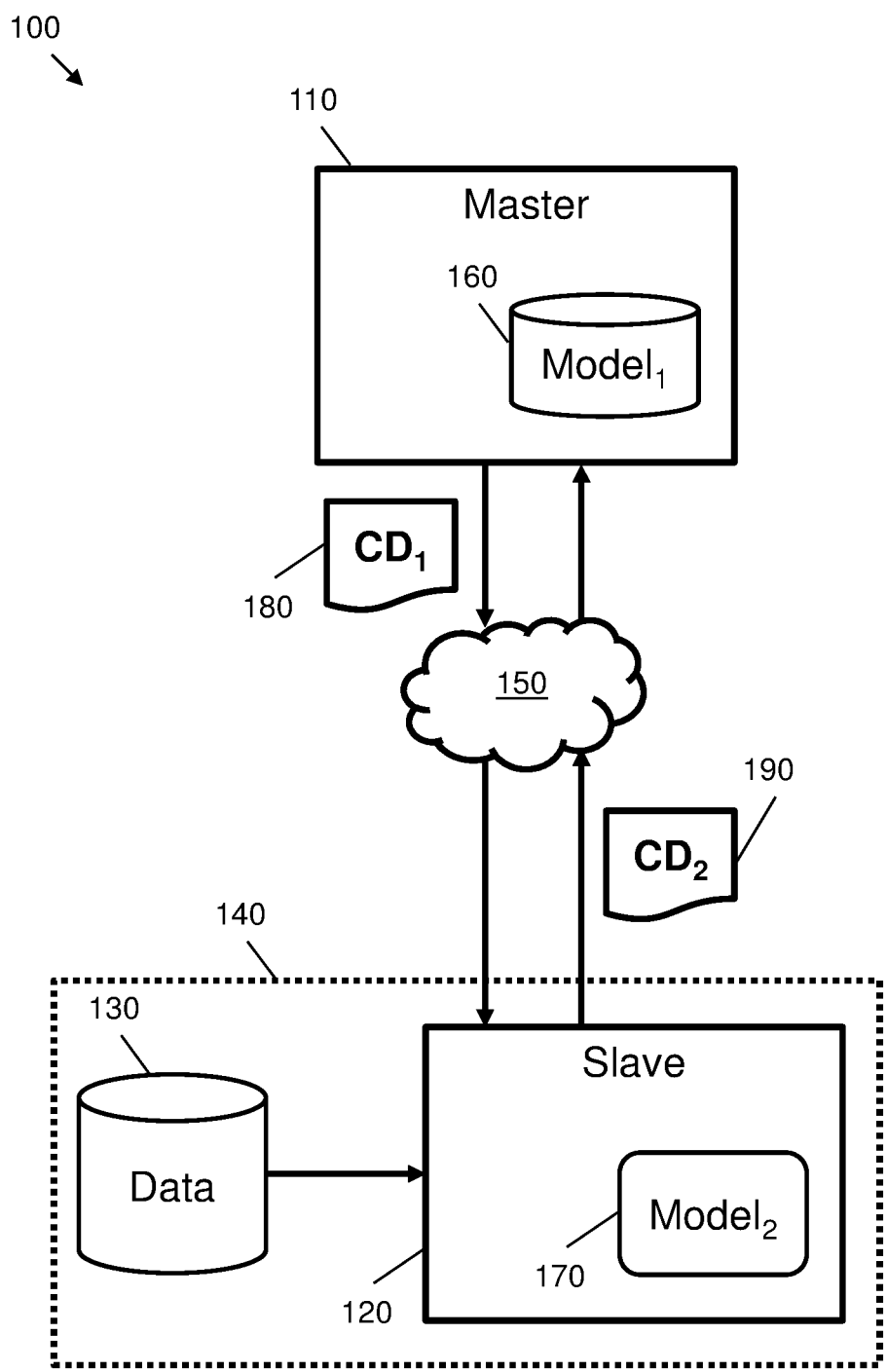
FIG. 1 shows a system for distributed training of a neural network model according to an embodiment of the invention.

The following describes various examples of the present technology that illustrate various aspects and embodiments of the invention. Generally, examples can use the described aspects in any combination. All statements herein reciting principles, aspects, and examples, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases", "examples" or similar language means that a particular aspect, feature, structure, or characteristic described in connection with the example is included in at least one embodiment of the invention. Thus, appearances of the phrases "in one case," "in at least one example," "in an example," "in certain cases," and similar language throughout this specification may, but do not necessarily, all refer to the same embodiment or similar embodiments. Furthermore, aspects and examples of the invention described herein are merely exemplary, and should not be construed as limiting of the scope or spirit of the invention as appreciated by those of ordinary skill in the art. The disclosed invention is effectively made or used in any example that includes any novel aspect described herein. Furthermore, to the extent that the terms "including", "includes", "having", "has", "with", or variants thereof are used in either the detailed description and the claims, such terms are intended to be inclusive in a similar manner to the term "comprising." In examples showing multiple similar elements, such as storage devices, even if using separate reference numerals, some such examples may work with a single element filling the role of the multiple similar elements.

Certain embodiments described herein relate to a distributed system for training a neural network model. These embodiments use a master device and one or more slave devices. The neural network model may be a model for use in an automatic speech recognition system. For example, the neural network model may be an acoustic model that receives audio data as input and outputs linguistic data indicative of linguistic features determined to be present within the audio data. The linguistic features may comprise one or more of phonemes, graphemes, characters, letters, words and sub-word units This linguistic data may be used by a language model, which may itself be another neural network model, to convert the input audio data into text and/or command data associated with a spoken phrase.

In embodiments described herein, "neural network model" is used to refer to an artificial neural network that is configured to perform a particular data processing task. For example, in the case that a neural network model includes an acoustic model, the task may be to output phoneme or grapheme data (e.g. predictions of phonemes or graphemes) based on input audio data. In the case that a neural network model includes a language model, the task may be to output text data based on input sequences of phoneme or grapheme data. In certain cases, a neural network model may be a model that is configured to provide a particular mapping between defined input data and defined output data. The input data may represent one modality and output data may represent another modality. The neural network model may be considered a function approximator that is trained on a set of data.

Certain examples described herein utilize different versions of a neural network model. For example, a master device may implement a first version of a neural network model and a slave device may implement a second version of a neural network model. In the examples, a "version" may include an instantiation of a defined "template" neural network model. The "template" neural network model may specify common properties of all versions of the neural network model, e.g. in the form of input or output data type or format, connectivity, neural network type etc. However, each "version" of the neural network model may differ. For example, different versions may include a different number of layers and/or nodes, and/or be configured to process data of differing bit-depths. In embodiments, versions of a neural network model may differ by at least parameter data, such as values for weights and biases. In certain cases, different versions of a neural network model may include different instances of a neural network model. For example, if the neural network model is defined by a class (or class-like structure) in an object-oriented programming language, then each version may include a different instance of that class (e.g. include common data processing methods but different internal data). In certain cases, two versions of a neural network model may include two copies of a neural network model that are separated in space and/or in time, such as two copies of a common neural network model that are implemented on geographically or logically separated devices. The use of different versions of a neural network model will become clear in relation to the specific examples described below.

In certain examples described herein, a slave device instantiates a second version of a neural network model, where a first version of the neural network model is associated with a master device. The slave device is configured to instantiate the second version based on first configuration data received from the master device. The slave device is then arranged to train the second version of the neural network model using available data and then send second configuration data back to the master device. The master device may then update parameters for the first version of the neural network model based on the training. This process may be iterated over time. In this manner, both the master and the slave may share useful information relating to the neural network model so as to allow both versions of the model to output accurate predictions. This may be possible despite constraints on data access at the master and/or slave device.

Example Distributed Training System

Referring to FIG. 1, a distributed training system 100 is shown in accordance with an embodiment of the invention. The system 100 includes a master device 110 and a slave device 120. The master device 110 and the slave device 120 include computing devices, i.e. devices with at least one processor and a memory wherein the at least one processor is configured to execute computer program code loaded into the memory to perform one or more functions. In accordance with one embodiment and aspect of the invention, the master device 110 includes a server device and the slave device 120 includes a client device. In accordance with another embodiment and aspect of the invention, both the master device 110 and the slave device 120 include server devices. In accordance with some embodiment and aspect of the invention, one or more of the master device 110 and the slave device 120 include specialized processors for processing multi-dimensional arrays, such as graphical processing units (GPUs), tensor processing units (TPUs) and/or graph processors.

In FIG. 1, the slave device 120 is communicatively coupled to a first data source 130. In accordance with various embodiments, the first data source 130 includes an external data source or an internal data source. In accordance with various embodiments, the first data source 130 includes a data storage device that is communicatively coupled to a local area network 140. The first data source 130 stores data. In the present embodiment, the first data source 130 is accessible to the slave device 120 but is not accessible to the master device 110. For example, the first data source 130 is an internal data source for the slave device 120 or may only be accessible to devices coupled to the local area network 140. In accordance with various embodiments, the first data source 130 is located within one or more computer networks that are protected by a firewall, e.g. as defined by a logical boundary of the local area network 140. In accordance with various embodiments, the first data source 130 is not provide any publicly accessible interfaces, e.g. may not be accessible over the Internet. In accordance with some embodiments, the first data source 130 is present on one or more public networks and only allow authorized access. In some embodiments, the master device 110 does not have permission to access the first data source 130.

In FIG. 1, the master device 110 and the slave device 120 are communicatively coupled by at least one network 150, in accordance with various embodiments. The master device 110 is remote from the slave device 120. The master device 110 and the slave device 120 may be located on different computer networks that are managed by different entities. In accordance with one embodiment of the invention, the master device 110 is communicatively coupled to a first network and the slave device may be communicatively coupled to a second network (not shown), where the first network and second network are heterogeneous and communicatively coupled by one or more untrusted devices that make up the network 150. In accordance with various embodiments, the network 150 includes the Internet. In accordance with one embodiment, the master device 110 and the slave device 120 are configured to securely communicate over the network 150, e.g. using secure communication protocols. In accordance with various embodiments, the first data source 130 is not be accessible to the master device 110 over the network 150.

In FIG. 1, the master device 110 includes a first version of a neural network model 160, in accordance with various embodiments of the invention. In FIG. 1, the first version of a neural network model 160 is represented as a particular set of parameters to instantiate the neural network model. The model 160 is stored on a non-volatile data storage device that is accessible to the master device 110. The parameters include one or more of hyperparameters and parameters, such as weight and bias values, for one or more layers of the neural network model. In FIG. 1, the first version of a neural network model 160 is not instantiated, e.g. is not activated so as to make predictions or inferences as an executable model. However, in accordance with some aspects of the invention, the master device 110 may instantiate the first version of the neural network model 160, as described with respect to various aspects and embodiments that follow.

The slave device 120 is configured to instantiate a second version of a neural network model 170. As described above, the second version of the neural network model includes a copy of the first version of the neural network model or a version of the neural network model that is configured for the slave device 120. In accordance with various embodiments, if the master device 110 and the slave device 120 differ in processing resources (e.g., number of processors and memory sizes), the second version includes a smaller version of the neural network model and the first version includes a larger version of the neural network model, i.e. the second version may be of a size that is smaller than a size of the first version. The terms "smaller" and "larger" may refer to differences in one or more of: a number of trainable parameters (such as weights and biases), a number of layers (e.g. the second version may have fewer layers), and a data resolution for one or more of the input and output to the model (e.g. a first version may use a first resolution at a first bit depth and the second version may use a second, lower resolution at a second, lower bit depth). Although one embodiment is described in terms of the slave device 120 having a smaller model, in other embodiments this may be reversed, such that the master device 110 has a smaller model. In the case that the first version and the second version are copies, they may have the same neural network architecture, e.g. the same number of layers and node configurations.

In FIG. 1, the master device 110 generates first configuration data ($CD_1$) 180 that is sent to the slave device 120 for use in instantiating the second version of the neural network model 170. The first configuration data 180 is based on the first version of the neural network model 160. In accordance with an embodiment and aspect of the invention, the first configuration data 180 may indicate characteristics of the first version of the neural network model 160 that are used to instantiate the second version of the neural network model 170. These characteristics may include one or more of hyperparameters and parameters. The term "instantiate" as used herein may refer to a process of generating a particular instance or executable implementation of the neural network model according to a predefined configuration for use in one or more of training and inference. In accordance with some aspects of the invention, a version of the neural network model may be instantiated by implementing a class or class-like definition of the neural network model using initialization data. In this case, the initialization data includes the first configuration data 180. In certain cases, the first configuration data 180 also includes the class or class-like definition of the neural network model; in accordance with some aspects of the invention, this information may be supplied at an earlier time and/or by a different communication method (e.g. it may be loaded as part of an earlier-supplied executable or other setup file). Typically, an instantiated version of the neural network model includes computer program code that is present in memory together with data, where the computer program code is executable by a processor to perform one or more functions according to the data.

Once instantiated, the slave device 120 is configured to train the second version of the neural network model 170 using data from the first data source 130. The training includes retrieving a training set from the first data source 130 and using this to train a set of trainable parameters for the second version of the neural network model 170. In accordance with an embodiment and aspect of the invention, the training may include updating values of weights and/or biases using gradient information that is computed by evaluating the differential of a loss function. For labelled data, the loss function may include a comparison of an initial prediction with the second version of the neural network model 170 and a "ground truth" label. The slave device 120 is configured to output second configuration data ($CD_2$) 190 for the neural network model 170 based on the results of the training. In one case, the second configuration data 190 may include the gradient data that is generated during training. In another case, the second configuration data 190 may include updated parameter values for the second version of the neural network model 170 after training. Both approaches are described in more detail in other embodiments and aspects of the invention.

The second configuration data 190 is transmitted from the slave device 120 to the master device 110 over the network 150. It should be noted that the transmission of both the first configuration data 180 and second configuration data 190 may be indirect, e.g. by way of one or more intermediate devices, as is described with respect to other embodiments and aspects of the invention. The master device 110 is configured to use the second configuration data 190 to update parameters for the first version of the neural network model 160. The update parameters process involves updating the parameters for the first version of the neural network model 160 to account for improvements derived from the training at the slave device 120. In accordance with some aspects of the invention, the updating process may be performed online or offline. In the latter case, existing parameters that are stored in a data storage device may be loaded and modified within instantiating the first version of the neural network model 160. In the former case, the first version of the neural network model 160 may be instantiated and the loaded parameter values for this instance is updated in a training process using the second configuration data 190.

In accordance with one aspect of the invention, the second configuration data 190 does not include any data that is useable to identify a particular individual or entity, where the original data in the first data source 130 may be useable to perform this identification. As such, the second configuration data 190 may be considered as anonymized update data that is useable to update the parameters for the first version of the neural network model 160 without passing sensitive or private information that is held on the first data source 130 to the master device 110. In accordance with some aspects of the invention, the distributed training system 100 keeps data held on the first data source 130 confidential.

In accordance with an embodiment and aspect of the invention, the master device 110 may be controlled by a first entity and the slave device 120 (and components within the local area network 140) may be controlled by a second entity. The data stored on the first data source 130 may be private. The distributed training system 100 maintains this privacy and allows the sharing of data relating to the neural network model between the two entities. In accordance with an embodiment of the invention, the neural network model includes an acoustic model for an automatic speech recognition application. In accordance with an aspect of the invention, the master device 110 may belong to a first entity that is a manufacturer (e.g. designer or creator) of speech recognition devices; the slave device 120 may then belong to a second entity that is a supplier (e.g. retailer) of the speech recognition devices to a particular set of users. In accordance with an embodiment of the invention, the slave device 120 may form part of an emergency services system that receives and processes speech for emergency calls. In this case, the first data source 130 may store audio data associated with the emergency calls. The audio data may include raw sound recording (e.g. from a phone call) and/or derived audio features such as one or more of Mel Frequency Cepstral Coefficients (MFCCs) and Filter Bank outputs. In this case, it may be desired to improve the performance of the emergency services system without exposing the confidential data of the calls. By using the distributed training system of FIG. 1, the manufacturer of the speech recognition devices is able to make improvements to the neural network model, which may be embodied within the first configuration data 180. The slave device 120, which may form part of the emergency services system, is able to use those improvements in an instantiated second version of the neural network model 170 and train that model on the private data in the first data source 130. Improvements from that training may then be embodied within the second configuration data 190, wherein this data, as it results from training over many different samples, does not provide information that is useable to determine individual events and individuals represented within the original speech data. The second configuration data 190 may then be transmitted to the manufacturer of the speech recognition devices and used to improve the first version of the neural network model. This process is repeated to improve the accuracy of the acoustic model over time.

The manufacturer of the speech recognition devices is also able to send the first configuration data 180 to other slave devices 120. In accordance with an embodiment and aspect of the invention, the manufacturer repeats the process for a second slave device 120 that is implemented as part of a military speech recognition system. The military speech recognition system may need to be trained on data that is secret for reasons of national security. The second configuration data 190 may again be generated and used to update the first version of the neural network model.

In accordance with various embodiments and aspects of the invention, there are multiple slave devices, each with data sources that are not accessible to a master device. Using the distributed training system of FIG. 1, second configuration data 190 from different slave devices may be received and combined to update the parameters of the first version of the neural network model. Those updated parameters may then be communicated to the different slave devices via the first configuration data 180. In this manner, even though slave devices 120 may not be able to allow access to sensitive or private data, the slave devices 120 are still able to share information that may be used to improve an accuracy of the neural network model. When speech processing, this may manifest as an improved speech recognition rate, lower cost, and/or lower power consumption for speech recognition processing.

In accordance with an aspect of the invention, the first configuration data 180 includes hyperparameters for the first version of the neural network model. These may include parameters that do not relate to weights and biases of a neural network model but instead relate to global settings of the neural network model. Hyperparameters includes one or more of: an architecture definition for the neural network model (such as a number of layers, a dimensionality of the input and/or the output etc.); a number of nodes for one or more layers in the neural network model (e.g. an input-output dimensionality configuration for each layer); a set of node definitions indicating one or more of a node type and a node connectivity; a set of activation function (e.g. non-linearity) definitions; and one or more cost or loss function definitions. Hyperparameters may also include learning rates, loss function weightings, training method definitions etc. The hyperparameters may be used to initialize a blank or empty copy of the first version of the neural network model. In accordance with some aspects of the invention, the first configuration data 180 includes hyperparameters that are generated by processing the first version of the neural network model 160, e.g. if a smaller version of a neural network model is used as the second version of the neural network model 170, then the layer and/or node configurations may be smaller or reduced versions of the first version of the neural network model 160.

Additionally, or alternatively, the first configuration data 180 includes parameters for the first version of the neural network model 160. These may be parameters such as one or more of: weight values for one or more connections between nodes of the neural network model (e.g. weight values for a defined layer of a neural network architecture); weight values for one or more inputs to the neural network model (e.g. weight or embedding values for one or more input or embedding layers); weight values for one or more recurrent paths in the neural network model (e.g. for one or more layers within a recurrent neural network architecture); and bias values for one or more nodes of the neural network model.

In accordance with an aspect of the invention, bias values may be provided as part of weight value data (e.g. a bias may be implemented by adding a constant to an input vector). The parameters may be used to initialize a copy of the first version of the neural network model. In other cases, the first configuration data 180 may include parameters that are generated by processing parameters for the first version of the neural network model 160, e.g. if a smaller version of a neural network model is used as the second version of the neural network model 170, then certain original parameters may be aggregated, omitted or otherwise down sampled.

In a similar manner, in accordance with various aspects of the invention, the second configuration data 190 includes parameters for the second version of the neural network model 170. As the second version of the neural network model 170 is instantiated based on the first configuration data 180, the hyperparameters for the second version of the neural network model 170 may be known to the master device 110 and so may not need to be transmitted again from the slave device 120. The parameters for the second version of the neural network model 170 may include values for trainable parameters, such as weight and bias values as set out above. Non-trainable parameters may not be shared, as these may be confirmed via the exchange of the first configuration data 180. In accordance with various embodiments and aspects of the invention, one or more of the first and second configuration data include data files for a data processing library, such as the ".npy" data format used by the NumPy Python library.

Training at the Master Device

Figure 2:
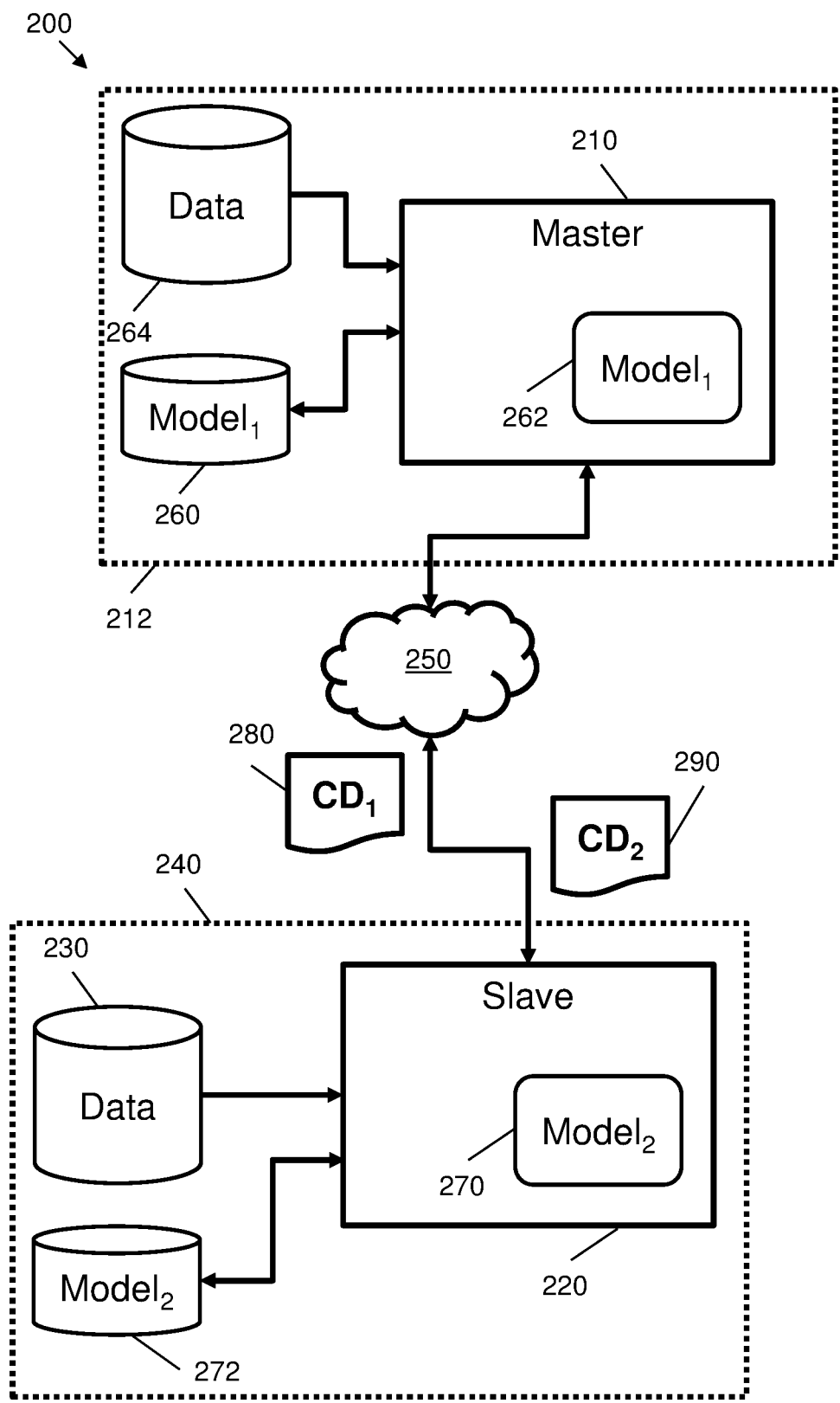
FIG. 2 shows a system for distributed training of a neural network model according to another embodiment of the invention.

Referring now to FIG. 2, a distributed training system 200 is shown in accordance with an embodiment of the invention. The distributed training system 200 may be seen as a variation of the first distributed training system 100 of FIG. 1 and similar features share similar reference numerals. In accordance with an embodiment and various aspects of the invention, a master device 210 has access to a master data source 264. The master data source 264 may be inaccessible by a slave device 220. As per the first data source 130 in FIG. 1, the master data source 264 may be internal to the master device 210 or communicatively coupled to a local area network 212 for the master device 210, wherein the local area network 212 has a firewall that prevents or controls access to at least devices on the master local area network 212. The master device 210 also has a storage device 260 to store parameter data for an instantiated first version of a neural network model 262. This may be an internal or external storage device. The slave device 220 also has a storage device 272 to store parameter data for an instantiated second version of a neural network model 270 and has access to a slave data source 230 similar to the first data source 130 of FIG. 1.

In accordance with an embodiment of the invention shown in FIG. 2, the master device 210 is configured to instantiate the first version of the neural network model 262 using the parameter data from the storage device 260. This includes a process similar to that described for the second version of the neural network model 170 in the example of FIG. 1. The first version of the neural network model 262 may be instantiated using the first configuration data ($CD_1$) 280 or similar data. The master device 210 is then configured to train the first version of the neural network model 262 using data from the master data source 264. In accordance with an aspect of the invention, the first version of the neural network model 262 is instantiated with a set of initial trainable parameters, such as a set of randomly sampled weights (i.e. to generate a set of random weight values), and the training using data from the master data source 264 adjusts the trainable parameters, such that the first version of the neural network model 262 achieves a first level of accuracy. In accordance with another aspect of the invention, the first version of the neural network model 262 is instantiated with a set of trained parameters from a previous training session, e.g. as may be stored in the storage device 260. Following training, an updated set of parameters is stored as updated parameter data within the storage device 260. The first configuration data 280 is generated based on this parameter data.

The slave device 220 uses the first configuration data 280 to instantiate the second version of the neural network model 270. In the case that the first configuration data 280 includes the trained parameters for the first version of the neural network model, these are stored in the storage device 272 and used to set the parameter values for the second version of the neural network model 270. Following training on data from the slave data source 230, the slave device 220 stores an updated set of parameters in the storage device 272 and use these to generate a second configuration data ($CD_2$) 290 that is sent to the master device 210. The master device 210 receives the second configuration data 290 and uses it to update the parameter data stored in the storage device 260. In accordance with an embodiment of the invention, the second configuration data 290 may be used as part of a further training operation at the master device 210. Again, this process may be periodically repeated to update parameter values for both versions of the neural network model.

The example of FIG. 2 may allow a form of transfer learning to be implemented. In a speech processing example, the master device 210 may have access to a large corpus of speech data and use this to train a general or universal speech recognition model. For example, the master device 210 may have access to a large library of training examples for American English and use this to train a neural acoustic and/or language model as a first version of a neural network model. The slave device 220 may then adapt this general or universal speech recognition model for a specific use case via the training on the data from the slave data source 230. For example, the slave device 220 may supply a version of the original universal speech recognition model that has higher accuracy with a particular field of use, e.g. for UK English, French or for, to use the example above, speech style used in the field of emergency response calls. The second configuration data 290 may be used by the master device 210 to either improve the accuracy of the first version of the neural network model 262, e.g. to improve a general or universal speech recognition model, and/or to generate different additional versions of the neural network model associated with each particular slave device. This approach may be used to provide automatic speech recognition that is easily tailored to different devices, users, languages and/or environments.

Teacher-Student Example

In accordance with various embodiments and aspects of the invention, the master-slave arrangement of FIGS. 1 and 2 may be configured to implement a teacher-student training model. In these embodiments and aspects of the invention, the first version of the neural network model is used as a teacher for a slave student model and the second version of the neural network model is used, in turn, as a teacher to teach the first version of the neural network model as a master student model. This provides a mechanism, by which, each version of the neural network model may be updated. This mechanism is useful for asynchronous implementations where configuration data may be exchanged at long or irregular intervals between the master device and the slave device (e.g. on the order of days or weeks as opposed to seconds or minutes or as part of firmware, operating system, or app updates).

Figure 3:
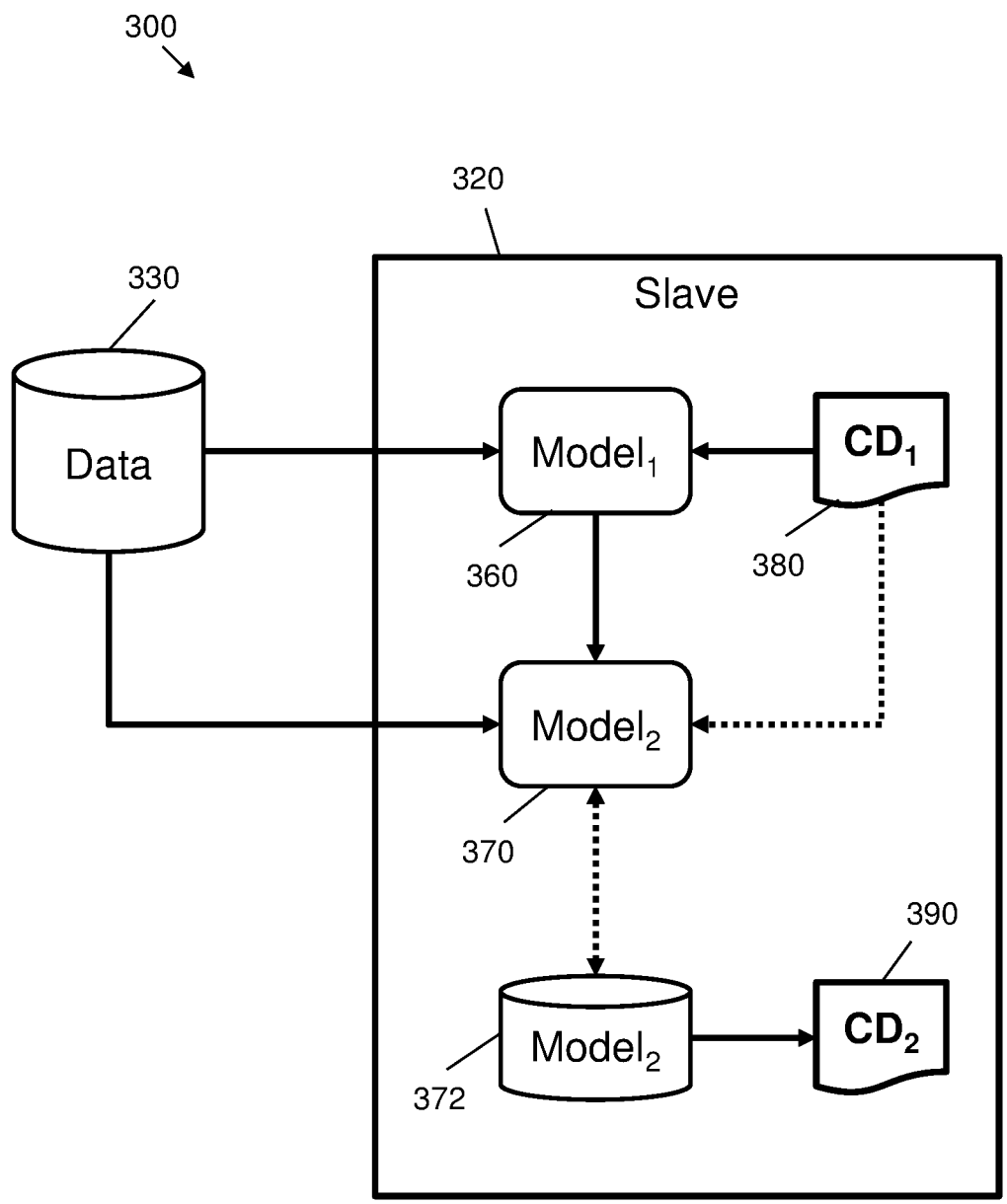
FIG. 3 shows a slave device for a distributed training system according to an embodiment of the invention.

Referring now to FIG. 3, a device 300 is shown in accordance with an embodiment and aspect of the invention. The device 300 includes a slave device 320 that implements a first teacher-student configuration. As in the examples of FIGS. 1 and 2, the slave device 320 is communicatively coupled to a first data source 330 and instantiates a second version of the neural network model 370. In accordance with an embodiment and aspect of the invention, the second version of the neural network model 370 is instantiated based on an initial set of parameters that are stored in data storage device 372 (e.g. as per the example of FIG. 2). In accordance with an aspect of the invention, as indicated by the dotted line, one or more of hyperparameters and parameters from a first configuration data ($CD_1$) 380 may also be used to instantiate the second version of the neural network model 370.

In FIG. 3, the slave device 320 is configured to use first configuration data 380 that originates from a master device to instantiate a first version of the neural network model 360 within the slave device 320. For example, the first version of the neural network model 360 may be instantiated on the slave device 320 as per the instantiation of the first version of the neural network model 262 on the master device 210 of FIG. 2, and/or as per the instantiation of the second version of the neural network model 370.

The first version of the neural network model 360 is instantiated for use as a teacher model. The parameters of the first version of the neural network model 360 are fixed (e.g. the weights and biases may not be trainable). This differs from the example of instantiation at the master device 210 in FIG. 2. The slave device 320 is then configured to instantiate the second version of the neural network model 370 as a student model. The parameters of the second version of the neural network model 360 are trainable (e.g. the weights and biases may be trainable). Data from the first data source 330 is input to both the first version and second version of the neural network model 360 and 370, respectively. The data may be one or more of labelled and unlabeled data. An output of the first version of the neural network model 360 is communicated to the second version of the neural network model 370 and is used to train the second version of the neural network model 370. As such, the teacher model is used to train the student model. Updated parameter data for the second version of the neural network model 370 may be stored in the data storage device 372. In one case, gradient data may also be stored. The contents of the data storage device 372 may be used to generate the second configuration data 390 that is communicated back to a master device.

In accordance with an embodiment and aspect of the invention, the first and second versions of the neural network model 360 and 370 start as copies of a common neural network configuration, e.g. that is initialized based on the first configuration data 380. Thus, just the parameters of the second version of the neural network model 370 change during training. The updated parameters is stored in the data storage device 372. An output from the first version of the neural network model 360 forms part of a loss function for the second version of the neural network model 370, such that during training the second version of the neural network model 370 "learns" to approximate the first version of the neural network model 360.

Figure 4A:
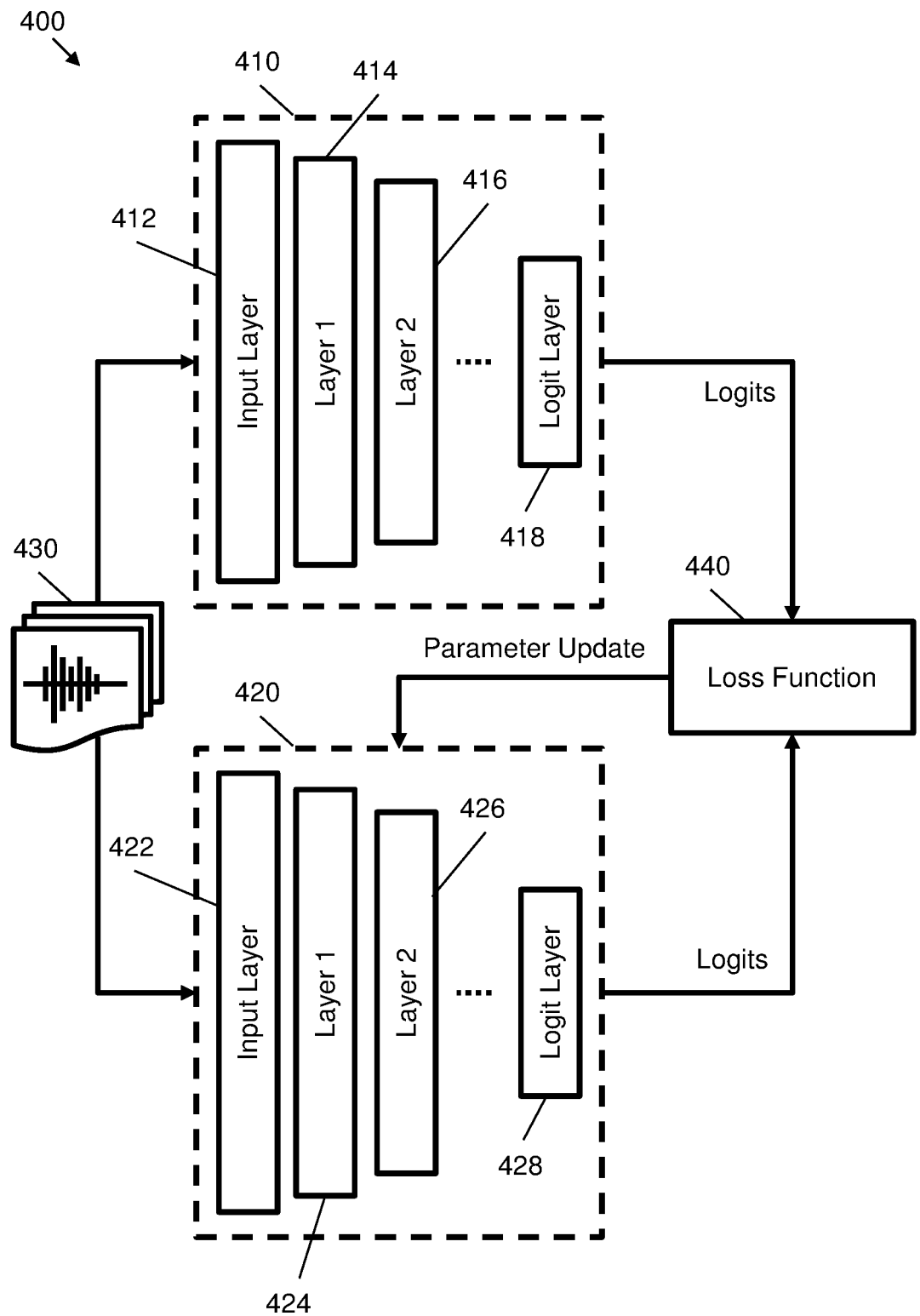
FIG. 4A shows a first example teacher-student configuration.

Referring now to FIG. 4A, shows an embodiment 400 is shown in accordance with an aspect of the invention, wherein a first version and a second version of the neural network model 410 and 420 are copies of a common neural network configuration. The first version of the neural network model 410 includes an input layer 412, a plurality of intermediate layers (including at least a first layer 414 and a second layer 416), and a log it layer 418. The second version of the neural network model 420 includes a similar configuration: an input layer 422, a plurality of intermediate layers (including at least a first layer 424 and a second layer 426), and a log it layer 428. For examples where the neural network model outputs a classification, the log it layers include a layer before a SoftMax layer, e.g. a non-normalized output or "soft" category label. In accordance with an aspect of the invention, a different output layer to a log it layer is used. The first and second versions of the neural network model 410 and 420, respectively, include any known neural network layers, e.g. one or more of convolutional layers, feed forward layers and recurrent layers. Different types of layers may be used in combination. Different layers may have different numbers of nodes. Each node may be followed by a defined activation function to add a differentiable non-linearity.

In FIG. 4A, the first and second versions of the neural network model 410 and 420, respectively, are trained on audio data 430, which includes one or more of raw waveform data for one or more timesteps, frequency data for one or more timesteps, filter bank measurement for one or more timesteps, spectrograms (e.g. frequency magnitude or using a Mel scale or set of Mel filter banks), etc. Each sample of the audio data 430 in a training set is supplied to both the first and second versions of the neural network model 410 and 420, respectively. The first and second versions of the neural network model 410 and 420, respectively, provide a log it output from respective log it layers 418 and 428. The log it outputs from the first and second versions of the neural network model 410 and 420 are passed to a loss function 440 for the second version of the neural network model 420. The loss function may be based on the Kullback Leibler distance or relative entropy between the two sets of log its; this effectively aims to teach the second version of the neural network model 420, as a student, to model the probability distributions as per the first version of the neural network model 410, acting as a teacher. As shown in FIG. 4A, the loss function 440 is used to determine a parameter update for the second version of the neural network model 420, e.g. based on optimization methods (e.g., gradient descent and the like). The process is repeated for a plurality of audio samples 430 (e.g. batches of input data) in order to train the second version of the neural network model 420.

In teacher-student configurations, as a loss function 440 compares log its between the two versions of the model, training is performed with unlabeled data, e.g. as the log its are compared as opposed to an output of the second version of the neural network model 420 and a "ground truth" classification label. In accordance with various aspect of the invention, the second version of the neural network model 420 is additionally trained with labelled data, e.g. with SoftMax output layers attached, to further improve accuracy on the labelled training set. Hence, training is performed using a combination of labelled and unlabeled data.

Figure 4B:
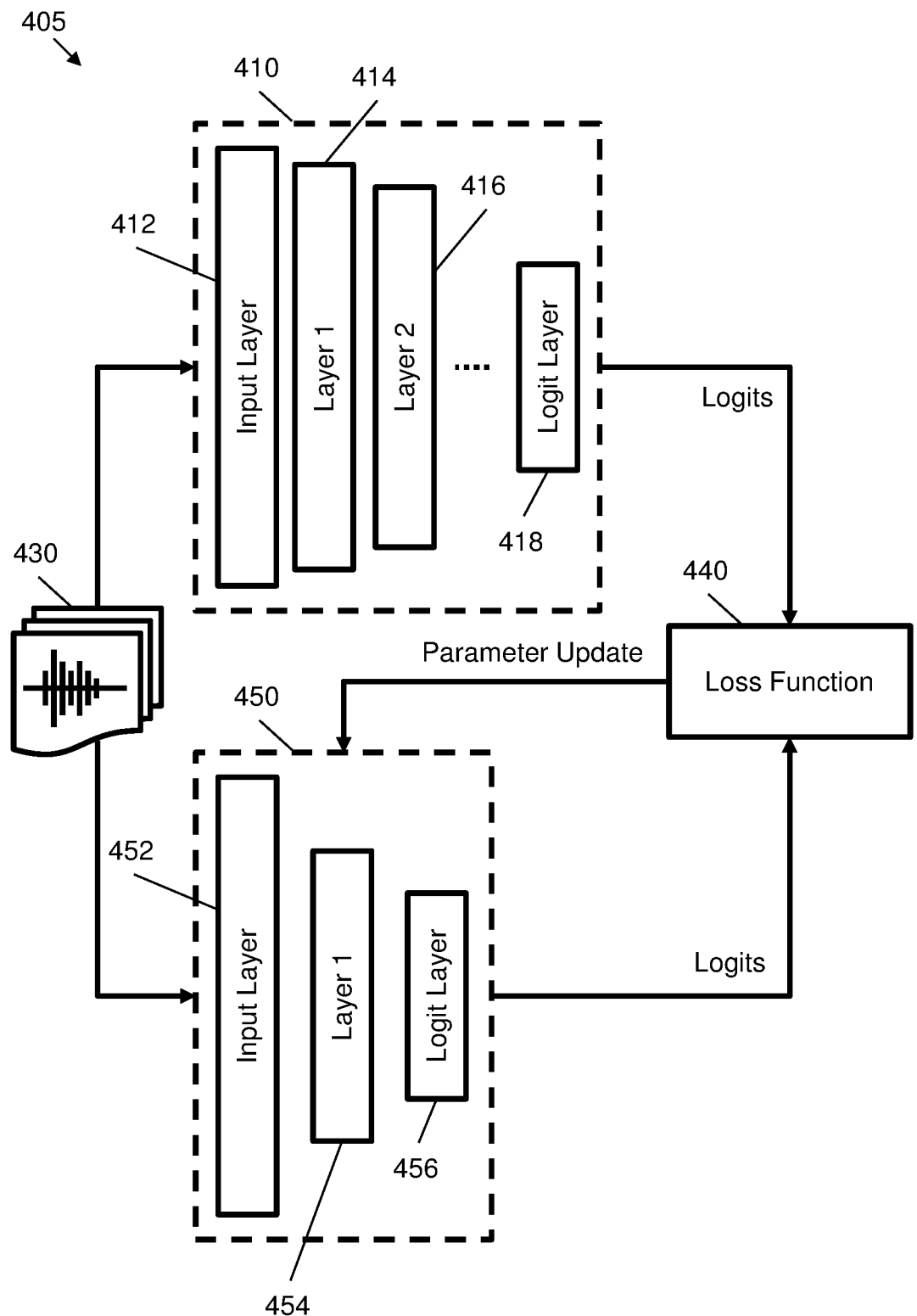
FIG. 4B shows a second example teacher-student configuration.

Referring now to FIG. 4B, which shows an alternative embodiment 405 in accordance with an aspect of the invention. A first version and a second version of the neural network model include different configurations of the same underlying model. In FIG. 4B the first version of the neural network model 410 is shown as set out in FIG. 4A. However, in the present example, the second version of the neural network model 450 is a reduced model including an input layer 452, an intermediate first layer 454 and a log it layer 456. The configurations of FIGS. 4A and 4B are to be understood as schematic examples and the number of layers or configurations of the versions of the neural network model shown are not to be considered limiting.

FIG. 4B shows how the second version of the neural network model 450 differs from the first version of the neural network model 410 and is taught in a similar manner to the setup of FIG. 4A. In accordance with an embodiment and aspect of the invention, the second version of the neural network model 450 includes a smaller version of the first version of the neural network model 410 in order to attempt to "distill" the "knowledge" of the first version of the neural network model 410, i.e. to obtain comparable accuracy using the second version of the neural network model 450 with fewer parameters, which may be preferred for production systems.

Figure 5:
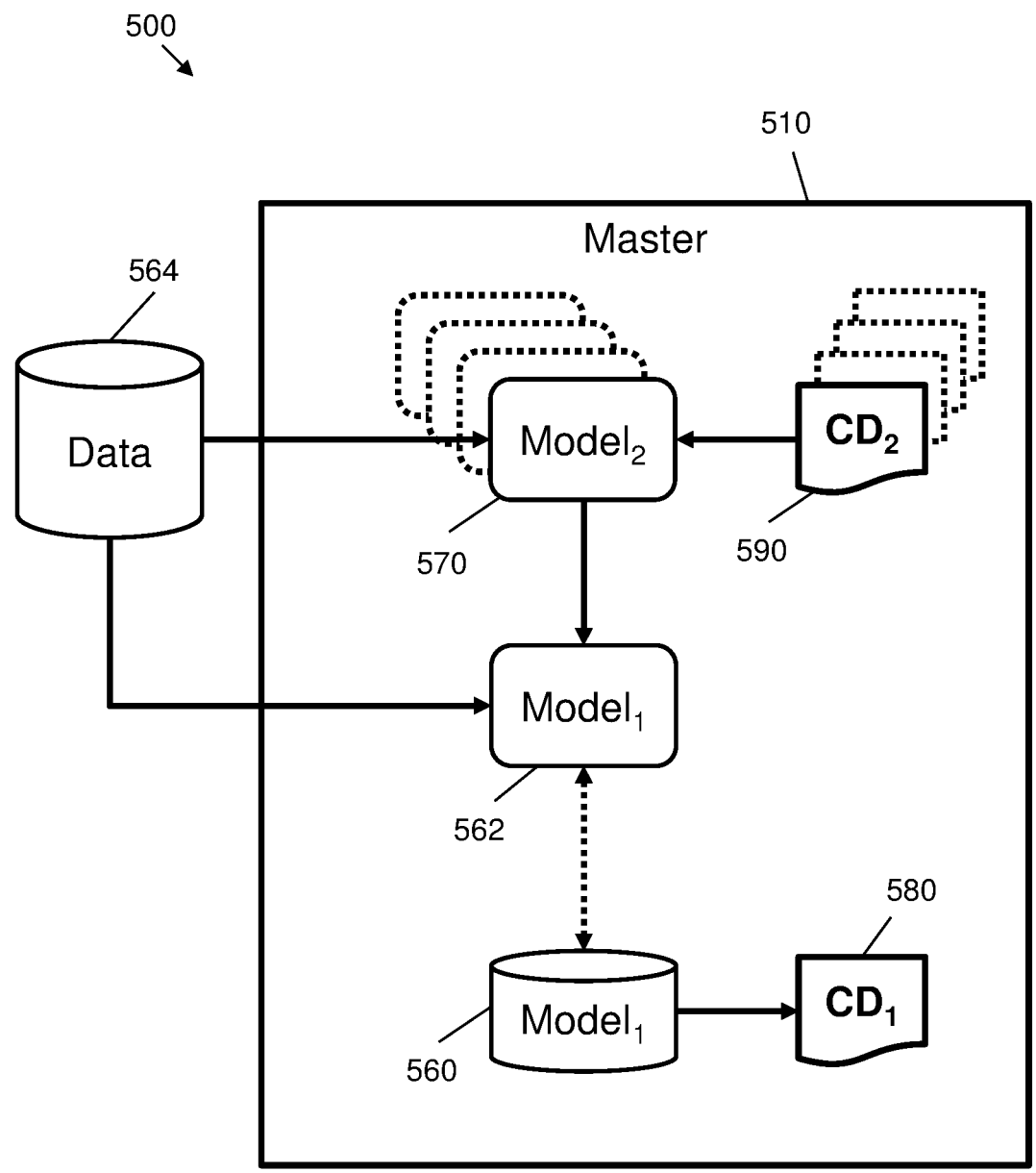
FIG. 5 shows a master device for a distributed training system according to an embodiment of the invention.

Referring now to FIG. 5, an embodiment 500 is shown in accordance with an aspect of the invention. A teacher-student training model is used at a master device to transfer knowledge from one or more slave device models to the master device model. The embodiment 500 is similar to the embodiment of FIG. 3 and the roles of the teacher and student have been reversed: the second version of the neural network model from the slave device is now used to train the first version of the neural network model at the master device.

A master device 510 is shown in accordance with an embodiment and aspect of the invention, which may be a version of the master device 110 or 210 shown in FIGS. 1 and 2. The master device 510 is communicatively coupled to a master data source 564, e.g. similar to the example of FIG. 2. The master device 510 includes a data storage device 560 that stores parameter data for the first version of the neural network model 562. The parameter data in the data storage device 560 is the data that is used to generate the first configuration data ($CD_1$) 580.

In FIG. 5, the master device 510 instantiates a first version of the neural network model 562, e.g. in a similar manner to the example of FIG. 2. The first version of the neural network model 562 is instantiated using parameter data from the data storage device 560 that was used to generate an initial set of first configuration data 580. This initial set of first configuration data 580 may be the first configuration data 380 from the example of FIG. 3. In FIG. 5, the master device 510 also has access to second configuration data ($CD_2$) 590 from one or more slave devices. For example, the second configuration data 590 may be the second configuration data 390 as generated by the example of FIG. 3. Dashed lines indicate that second configuration data 590 may be received from a plurality of different slave devices.

The master device 510 uses the second configuration data 590 to instantiate a second version of the neural network model 570 as a teacher model. For example, the second version of the neural network model 570 may be a copy of the second version of the neural network model 370 following training. The second configuration data 590 includes parameter data, such as values for weights and biases, that enable the second version of the neural network model 570 to be instantiated on the master device 510. In this example, the first version of the neural network model 562 is configured as a student model. In accordance with an aspect of the invention, the parameters for the first version of the neural network model 562 are trainable, while the parameters for the second version of the neural network model 570 are not trainable. The setup may be similar to the examples of FIG. 3, 4A or 4B with the first and second versions of the neural network model swapping places. During training, which again may be on one or more of unlabeled data and labelled data, the parameters of the first version of the neural network model 562 are updated based on processing by the second version of the neural network model 570. As per FIG. 4A or 4B, each of the versions output log its that are compared in a loss function to steer the gradient descent update of the parameters of the first version of the neural network model 562. Following training in this manner, the parameter data in the data storage device 560 is updated, allowing a revised or updated set of first configuration data 580 to be generated. This can then be communicated to a set of slave devices to repeat the process.

Gradient Exchange

FIGS. 3, 4A, 4B and 5 show embodiments and aspects of the invention, which use a teacher-student model. In an alternative, or additional, embodiments and aspects of the invention, the second configuration data includes gradient data that is generated during training. The gradient data is used to update the parameters of the first version of the neural network model. The gradient data is generated when applying gradient descent based methods, such as gradient descent or stochastic gradient descent, and indicates how weights and biases are to be updated based on a training error. In this case, slave devices compute gradients on data that is inaccessible by a master device (e.g. private data) and then send the gradients to the master device to allow the master device to update the neural network model. As with the previous examples, heterogeneous processing units may be used and the training process may be asymmetric (e.g. may treat different processors differently). In addition, or alternatively, data derived from gradient data may be transmitted, such as compressed gradients or smoothed gradient values as used in the adaptive moment (Adam) type optimization algorithm.

Figure 6:
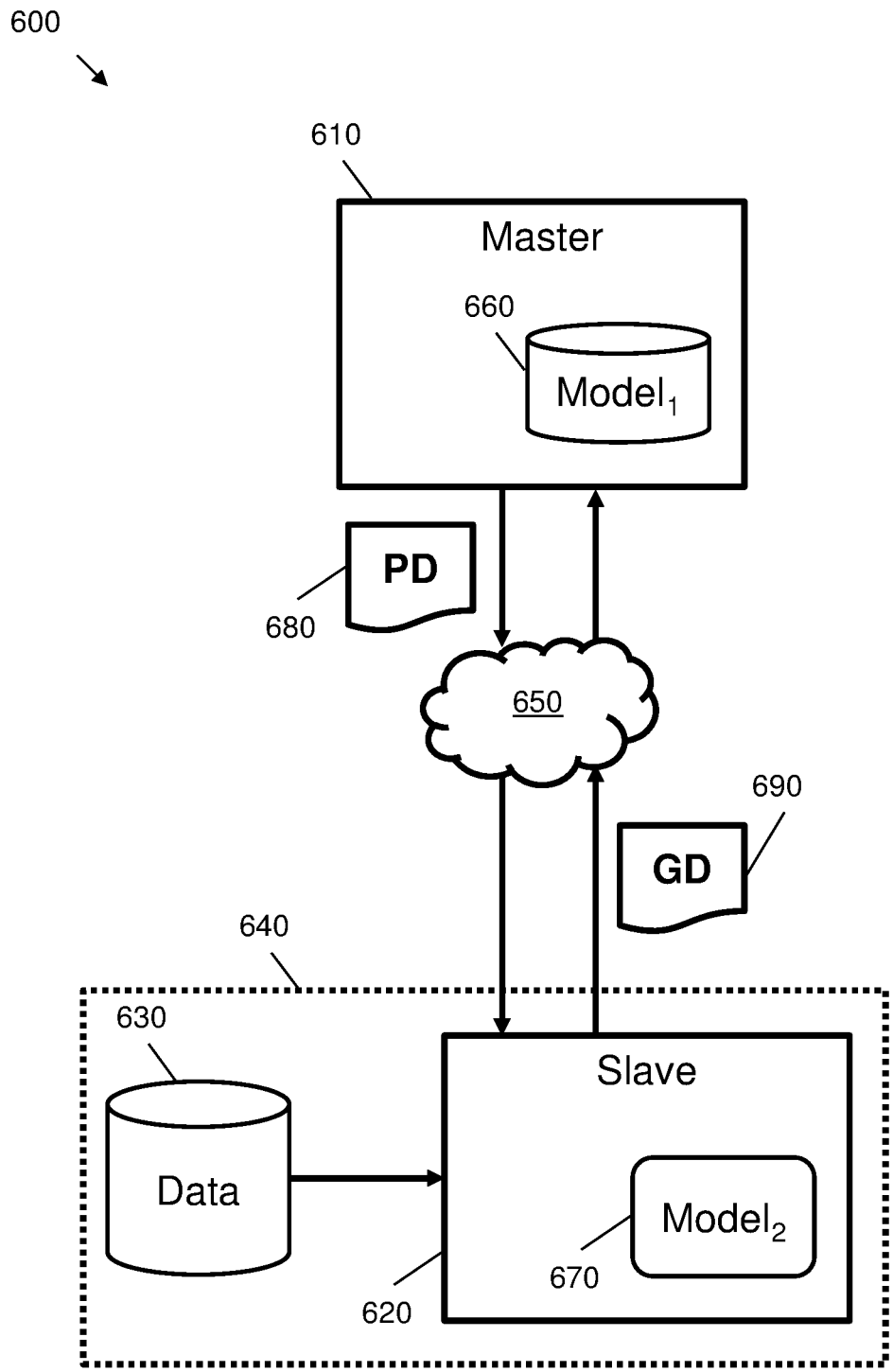
FIG. 6 shows a system for distributed training of a neural network model communicating gradient data according to an embodiment of the invention.

Referring now to FIG. 6, a distributed training system 600 is shown in accordance with an embodiment and aspect of the invention where gradient data is exchanged. The distributed training system 600 is similar to the distributed training system 100 shown in FIG. 1 and similar components are labelled with similar reference numerals. The first configuration data includes parameter data (PD) 680 and the second configuration data includes gradient data (GD) 690. The parameter data 680 includes one or more of parameters and hyperparameters for a first version of a neural network model 660. In accordance with an aspect of the invention, a first set of parameter data 680 may include hyperparameter data and this may be omitted from future communications of parameter data 680, unless the settings for hyperparameters are changed at the master device 610. As such the core of the parameter data 680 includes current values for weights and biases of the neural network model.

As in other aspects and embodiments of the invention, the parameter data 680 is received by the slave device 620 and is used to instantiate a second version of the neural network model 670. The instantiated second version of the neural network model 670 is trained on data from a first data source 630 that is inaccessible by the master device 610. Training in this manner generates gradient data 690, which is communicated back to the master device 610 over at least one network 650. The master device 610 uses the received gradient data 690 to update its version of the neural network model, i.e. parameters for the first version of the neural network model, and in turn is able to send out updated parameter data 680 to the slave device 620. The exchange of parameter data 680 and gradient data 690 may be at a higher frequency to the exchange of data in the teacher-student case.

Multiple Slave Devices

Figure 7:
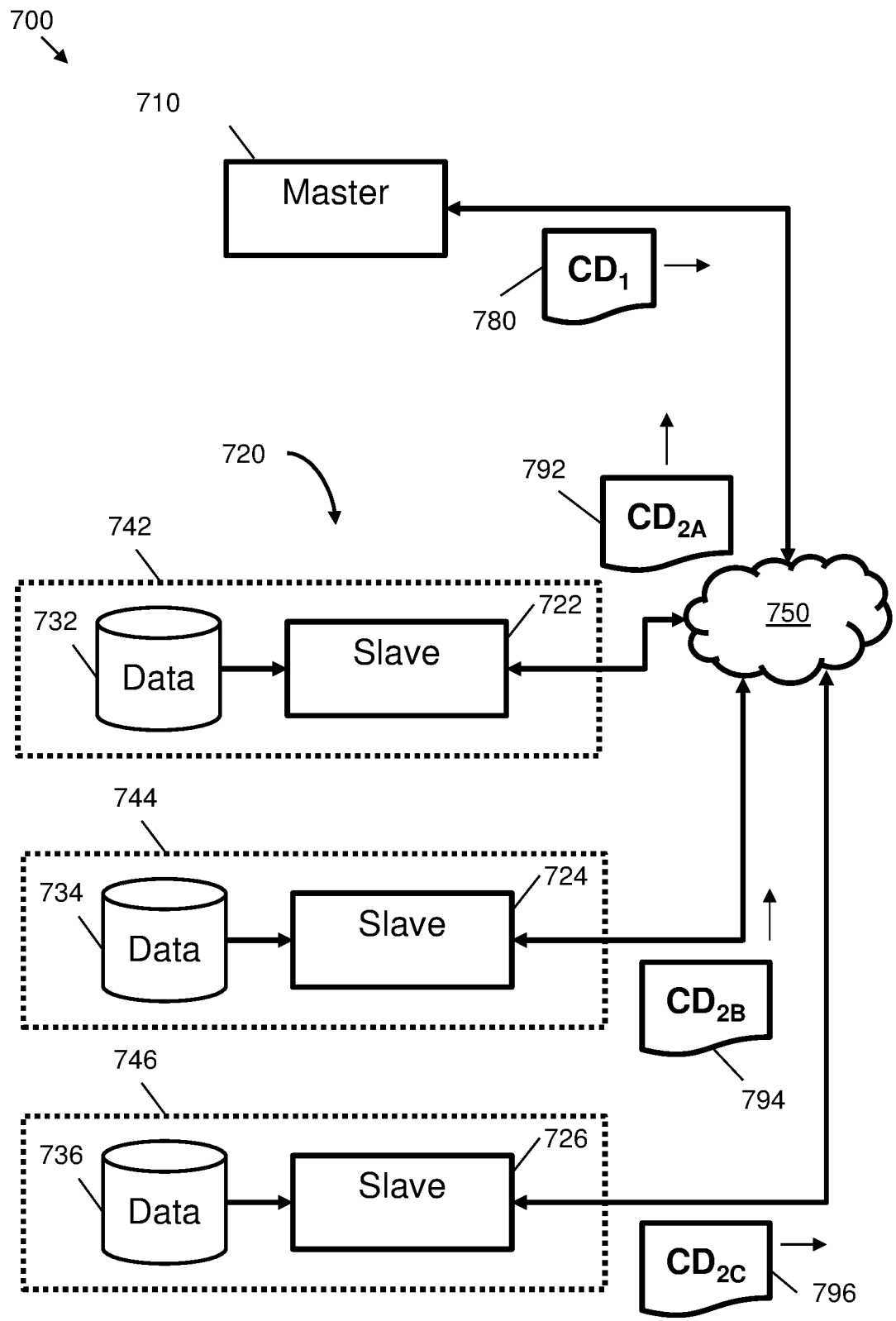
FIG. 7 shows a distributed training system with a plurality of slave devices according to an embodiment of the invention.

Referring now to FIG. 7, an example distributed training system 700 is shown, in accordance with an embodiment and aspect of the invention, where a master device 710 is communicatively coupled to a plurality of slave devices 722,

724, and 726. The teachings of this embodiment and aspect of the invention are applicable to any of the various other embodiments and aspects of the invention in order to extend the distributed training to any number of slave devices.

The slave devices 722, 724, and 726 are communicatively coupled to the master device 710 via one or more communication networks 750. The master device 710 is configured to transmit first configuration data 780 for distribution to the plurality of slave devices 722, 724, and 726 via one or more communication networks 750. Each slave device is communicatively coupled to a respective slave data source 732, 734, and 736, which as per FIGS. 1 and 2 may be inaccessible by the master device 710, e.g. may be located on respective private networks 742, 744, and 746. The slave data sources 732, 734 and 736 may also be inaccessible by other slave devices, e.g. the slave device 724 may not be able to access the slave data source 732 or the slave data source 736. Each slave device 722, 724, and 726 receives the first configuration data 780 from the master device 710 as per the previous examples and generates respective second configuration data ($CD_2$) 792, 794, and 796, which is communicated back to the master device 710 via the one or more communication networks 750. The set of second configuration data 792, 794, and 796 from the plurality of slave devices 722, 724, and 726, respectively, may be used to update parameters for the first version of the neural network model.

Referring now to FIGS. 8A, 8B and 8C, various embodiments 800, 820, and 840 are shown, in accordance with various aspects of the invention, for how master devices and slave devices may be logically configured according to a defined graph model. Although three different graph models are shown in FIGS. 8A, 8B and 8C, any number of different graph models may be used in implementation of various embodiments in accordance with the various aspects of the invention.

Referring specifically to FIG. 8A, the embodiment 800 shows how devices may be arranged according to a tree arrangement in accordance with an embodiment of the invention. The tree arrangement provides a hierarchy that allows for configuration data (e.g. first and second configuration data) to be efficiently exchanged. The tree arrangement of FIG. 8A has a master device 802 that acts as a central parameter server to provide first configuration data and receive second configuration data. The master device 802 is communicatively coupled to two sub-master devices 804 and 806. A sub-master device may include a form of master device that is configured to communicate with a defined subset of slave devices. The first sub-master 804 is communicatively coupled to three slave devices 808, 810 and 812. This subset of slave devices receives first configuration data from the first sub-master 804 and sends second configuration data to the first sub-master 804. The first sub-master 804 passes the second configuration data to the master device 802 and forwards first configuration data from the master device 802. The second sub-master 806 performs a similar role with a subset of two slave devices 814 and 816. The sub-masters 804, 806 may have a version of the neural network model. In certain cases, the sub-masters 804, 806 may act as slave devices in relation to the master device 802 but as a master device in relation to the subsets of child slave devices. Different configurations of the tree arrangement are possible with different parent-child relationships and different tiers of hierarchy.

Referring specifically to FIG. 8B, the embodiment 820 is a centralized hub arrangement with a master device 822 individually communicatively coupled to a plurality of slave devices 824 to 834 in accordance with an aspect of the invention. Each slave device 824-834 may communicate with the master device 822 as shown in the examples of FIGS. 1, 2 and 6. In more complex examples, one of the slave devices 824-834 may be a sub-master in a similar manner to sub-masters 804 and 806 to one or more additional slave devices.

Referring now specifically to FIG. 8C, the embodiment 840 shows an alternate configuration for the devices of FIG. 8B in accordance with an aspect of the invention. Here, a master device 842 communicates with a sub-master 846. The sub-master 846 forms part of a ring arrangement whereby slave devices 848 to 856 are communicatively coupled in series. In this case, the sub-master may send first configuration data from the master device 842 to a first slave device 848, which may in turn use it as well as forward it on to a second slave device 850. This may be repeated around the ring. Each slave device may also forward second configuration data that is eventually received by the sub-master 846, which may forward the second configuration data to master 842.

In the embodiments of FIGS. 8A, 8B and 8C, a sub-master may update a version of a neural network model in a similar manner to the master devices of the previous examples. The sub-master may then generate second configuration data as per the slave devices of previous examples for communication to a master device. In other cases, the sub-master may simply receive and forward the first and second configuration data.

Updating with Multiple Slave Devices

In accordance with an embodiment and aspect of the invention, when a plurality of slave devices is used, the master device may be adapted to process multiple portions of second configuration data. The master device is configured to use second configuration data output by the plurality of slave devices to instantiate an ensemble of second versions of the neural network model and to use the ensemble to train the first version of the neural network model. This, for example, is illustrated by the dashed lines in FIG. 5. In a teacher-student example, each set of second configuration data may include parameters for a separate version of a neural network model, e.g. include parameters for respective second versions of the neural network model that are implemented across the plurality of slave devices. In this case, the set of instantiated models may be used as an ensemble or collection of teachers to train a first version of the neural network model at the master device. For example, a loss function may be a function of log it values across the ensemble of instantiations of the second version of the neural network model. A loss function may aggregate the log it values from the ensemble, e.g. via averaging or another statistical computation (median, mode etc.). Alternatively, the first version of the neural network model may be trained iteratively with each of the instantiated second versions being used as teachers in turn. In certain examples, the master device is able to evaluate and exclude slave configuration data from its teacher ensemble based on a predefined level of performance on a validation dataset, e.g. if an instantiated second version of the neural network model has an accuracy score below a threshold on the validation dataset, it may be excluded from the ensemble.

In accordance with an embodiment and aspect of the invention where the second configuration data includes gradient data, the master device may be configured to use aggregate data derived from the second configuration data output by the plurality of slave devices to update parameters for the first version of the neural network model. For example, gradient data from the plurality of slave devices may be aggregated by averaging or another suitable statistical function. In one case, the gradient data from different slave devices may be compared to selectively update the parameters for the first version of the neural network model. For example, the master device may be configured to weight the gradient data based on an age of the second configuration data. In one implementation, the gradient data may have an associated staleness parameter that indicates an age of the gradient data (e.g. a time difference between a time at which the gradient data was generated and a processing time at the master device). The gradient data may then be combined in a weighted average whereby older data is given a lower weight to reduce its influence on the parameter update. In certain cases, a weight may be zero, i.e. in certain cases, if the staleness parameter has a value greater than a threshold then the gradient data may not be used to update the parameters of the first version of the neural network model.

In accordance with an embodiment and aspect of the invention gradient data is exchanged, due to differences between processing speeds on the slave devices and the master device and/or due to differences in the amount of data that each has available for training, there may be large differences in processing time per iteration of configuration data exchange (or per epoch of training). A specific target cycle time may be set (e.g. as a predefined interval) and a back-propagation algorithm on one or more of the master and slave devices may be configured to process enough training data to meet the target cycle time.

In accordance with an embodiment and aspect of the invention where gradient data is exchanged, differences in processing rate may cause differences in the amount of data that is evaluated at each device, which may in turn contribute to uncertainty in the gradient calculations. Furthermore, an accuracy of data collection may contribute to additional uncertainty in the gradient calculations. In this case, similar to the staleness case, gradient data may be assigned a particular uncertainty metric that is a measure of the uncertainty in the data. For example, this may be a value between 0 and 1 or 0% and 100%. In this case, the gradient data may be aggregated with a combining function that weights the different sets of gradient data inversely to a value of the uncertainty metric. In certain cases, the master device may be configured to determine a "samples per second" data processing rate on one or more slave devices. The master device may then dynamically adjust the number of samples per iteration on one or more of the master device and the slave devices to align iteration synchronization with the master device.

In accordance with an embodiment and aspect of the invention where the second configuration data includes gradient data, the master device may be configured to compare the gradient data from the second configuration data with gradient data determined using the first version of the neural network model. In this case, the master device may selectively update the parameters for the first version of the neural network model based on the comparison.

Distributed training systems that have multiple slave devices provide for collaborative, and potentially massive, joint training. It may be possible for new slave devices to join or leave the system at any time. In these cases, there may be a risk that certain gradient data is unsuitable for training and/or even malicious. In these cases, the master device may be configured to compare gradient values from different slave devices in order to identify sets of gradient values that are significant outliers. These may be excluded from any update of the parameters of the first version of the neural network model. Similar approaches may also be used to exclude certain sets of second configuration data for the teacher-student examples.

In accordance with an embodiment and aspect of the invention, the master device uses variations in gradient data between different slave devices as a measure of data quality or relevance. To produce neural network models that are appropriate for inference for any particular slave device, the master device may choose to train the first version of the neural network model only using gradient data that is within a predefined range of gradient data generated by either the master device or one or more other slave devices. For example, a data distribution for the gradient data across all devices or a subset of device may be determined and a threshold for use or exclusion set based on that data distribution (e.g. values that are more than 2 standard deviations away from a mean value may be excluded if the values are seen to be normally distributed). The threshold may be configured according to a desired preference, a smaller threshold may provide greater stability in training but a larger threshold may help locate better local minima. A similar approach may also be applied to a test or validation performance of different instances of the second version of the neural network model that are to be applied as teachers. One or more performance metrics may be determined and compared to predefined thresholds; performance below a threshold may lead to exclusion or down-weighting of a particular instance.

Executable Models

In accordance with an embodiment and aspect of the invention, the neural network model may be implemented by way of a binary executable that is supplied to one or more slave devices. For example, a slave device may include at least one processor to execute a binary executable stored in memory. In this case, the executed binary executable may be configured to load the first configuration data and instantiate a second version of the neural network model independently of the master device. The executed binary executable may also be configured to output the second configuration data and to control transmission to the master device.

Figure 9:
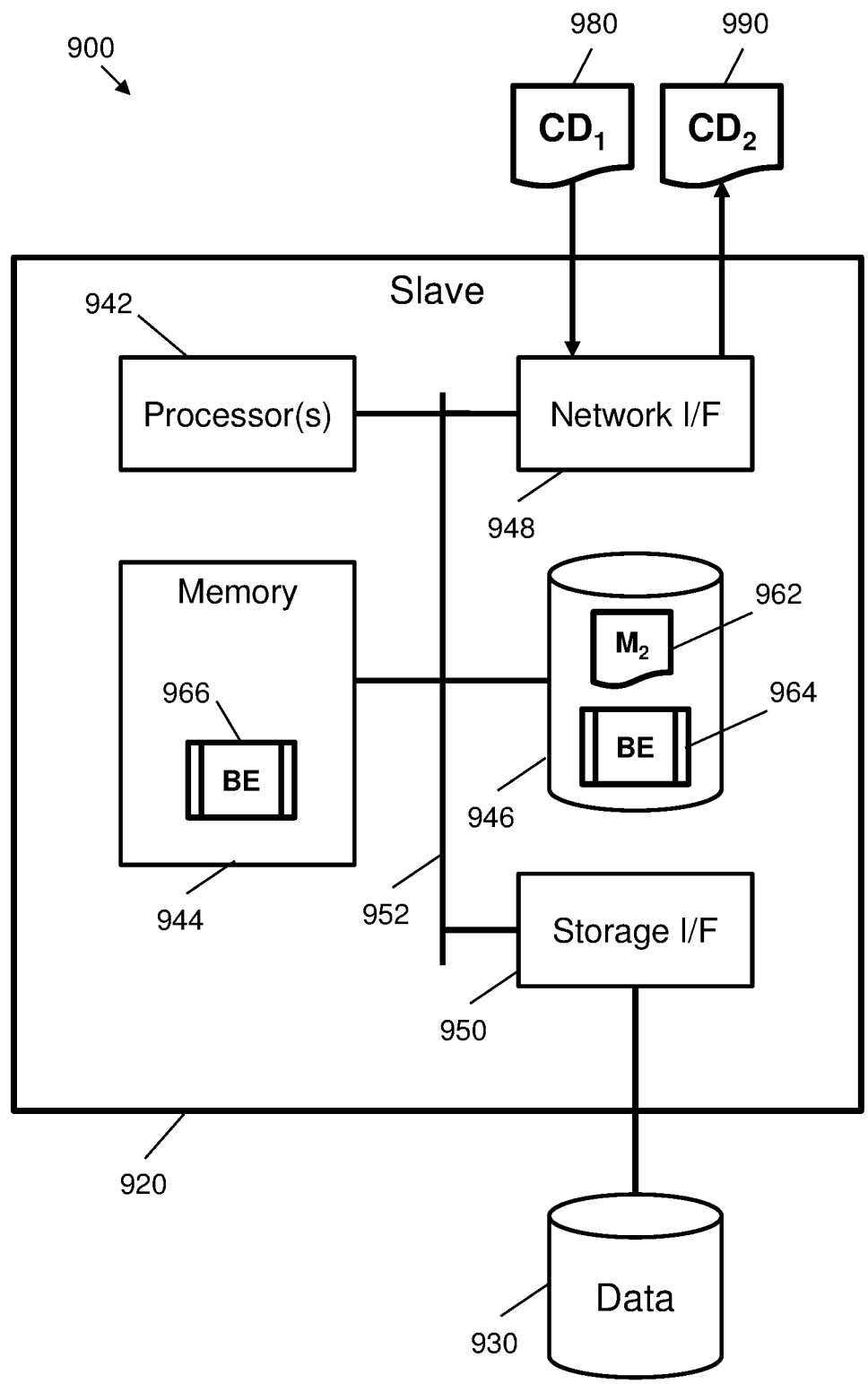
FIG. 9 shows components of a slave device according to an embodiment of the invention.

Referring now to FIG. 9, an embodiment 900 is shown, in accordance with an embodiment and aspect of the invention. The embodiment 900 includes a slave device 920. The slave device 920 includes at least one processor 942, a memory 944, an internal storage device 946, a network interface 948 and a storage interface 950. These components are coupled by an internal systems bus 952.

In accordance with various embodiments and aspects of the invention, the memory 944 may include a volatile memory such as Random Access Memory (RAM) and the internal storage device 946 may include a non-volatile data storage device, such as a hard disk drive or solid state drive. The storage interface 950 may include an interface for coupling the slave device 920 to a local or remote data source 930. In other embodiments, the data source 930 may be provided as part of the internal storage device 946, or the internal storage device 946 may be omitted and an external data source used in its place. The network interface is configured to communicate data over a network, such as one or more of the networks 140, 150, 250 etc. In FIG. 9, the network interface 948 is used to receive first configuration data 980 and to send generated second configuration data 990.

The storage device 946 stores parameter data 962 for a second version of a neural network model and a binary executable 964. The binary executable (BE) 964 may include compiled computer program code. In use, binary code (BC) 966 for the binary executable 964 is loaded into the memory 944. The binary code 966 may include machine code or other form of computer program code. The binary code 966 is configured to implement a distributed training operation when executed by the processor 942.

The binary executable 964 may instantiate the second version of the neural network model. For example, the binary executable 964 may include computer program code to implement the neural network model on the slave device 920. The binary executable 964 may contain initial parameter data for the second version of the neural network model or this may be loaded from the parameter data 962. In certain examples, the binary executable 964 may be configured to load first configuration data ($CD_1$) 980 to instantiate the second version of the neural network model. On a first run, the binary executable 964 may create the parameter data 962 from the first configuration data 980. The binary executable 964 may be configured to implement the training described herein and update the parameter data 962 for the second version of the neural network model. The binary executable 964 may also be configured to generate the second configuration data ($CD_2$) 990 for transmission to a master device. One or more of the binary executable 964 and the first configuration data 980 may indicate a device address and set of communication protocols for exchanging configuration data, e.g. for at least sending the second configuration data 990. The binary executable 964 may be configured to implement a secure communication channel between a master device and the slave device, and may be configured to encrypt and decrypt configuration data.

By using a binary executable 964 it may be possible to keep details of the first and/or second version of the neural network model confidential. In this manner, the slave device may be able to train the neural network model using data within the data source 930 without a user of the slave device having access to the hyperparameters and/or parameters of the neural network model. This then provides another layer of secure or private training. This may be combined with encrypted communication and storage such that the slave device 920 has no access to any details of the neural network model. The binary form of the data (e.g. following compilation) makes it difficult to reverse engineer the details of the neural network model. Both the binary executable 964 and the parameter data 962 may be encrypted within the storage device 946. In this manner, a master device can instruct training on a slave device and try different experimental models without the slave device being able to reverse engineer an optimal model. Accordingly, a provider of neural network technology operating a master device may keep their designs confidential while a provider of data operating a slave device may keep its data confidential.

In accordance with various aspects of the invention, the binary executable 964 may include a "container" or "empty box" executable. In this case, the binary executable 964 may include compiled computer program code or an executable script. The binary executable 964 in this case may be capable of implementing a variety of neural network models based on loaded data. In certain cases, the binary executable 964 may provide a template for a number of different versions of a given neural network model, e.g. the binary executable 964 may enable different versions of the given neural network model to be instantiated with different hyperparameter and/or parameter values. The hyperparameter and/or parameter values for a particular version of the neural network model may be provided in the first configuration data. Accordingly, a provider of neural network technology operating a master device may run numerous design experiments while a provider of data operating a slave device may decide when or how long to make its data available for such experiments.

Use of a binary executable 964 also facilitates implementation of the distributed training system of the examples. For example, a single executable file may be communicated to a plurality of slave devices and may enable those slave devices to implement a large variety of different neural network configurations. If the binary executable 964 is an "empty box" executable it may be distributed as open source computer program code (e.g. the high level computer program code before compilation may be published). This is possible because the "empty box" binary executable 964, on its own, contains no private or confidential data. Instead, this is provided separately (and securely) via (encrypted) the first configuration data 980. This also helps to allow slave devices to audit the computer program code that is instantiating at least the second version of the neural network model and check that the binary executable 964 does not comprise malicious program code (e.g. a check on a hash value of a compiled version of the high level code may indicate tampering). This is useful as the slave device may be exchanging data with the master device and it may need to be evidenced that the slave device is not being tricked into exchanging confidential or private data. In a case where gradients are exchanged, these may not be encrypted to evidence that confidential or private data is not being transmitted, e.g. these may be intercepted by either the slave device or a third party but they may be in the form of floating point values or integers that do not provide significant information regarding the data in the data source 930. Depending on security settings, in a case where model parameters are exchanged, these may be decryptable by the slave device to evidence that no private data is being transmitted (e.g. similar to the gradients they may include floating point values). Data privacy may also be verified by checking the bandwidth of network traffic between the master device and the slave device; both gradient and parameter data will typically be orders of magnitude smaller than the data within the data source 930.

In certain examples, the hyperparameters of the neural network model may be defined according to a predefined standard, and the binary executable may be designed specifically for this standard. This may help to minimize data exchange between the master device and the slave devices, which may speed training iterations. The first and second configuration data may simply consist of one or more fixed size files, e.g. one or more fixed sized ".npy" files.

In one case, the binary code 966 may be executed by the at least one processor 942 to perform a number of operations. These may include receiving, via the network interface 948, first configuration data 980 for the neural network model from the master device; instantiating the second version of the neural network model using the first configuration data 980; performing a training operation to train the second version of the neural network model using data from the data source 930 obtained via the storage interface 950; updating the parameter data 962 in the storage device 946 based on the training operation; and outputting, via the network interface 948, the second configuration data 990 for the neural network model based on data resulting from the training operation, wherein the master device is configured to use the second configuration data 990 to update parameter data for the first version of the neural network model.

Although the embodiment of FIG. 9 has been described with reference to a binary executable other implementations of the examples described herein may use an alternative approach such as a distributed client-server programming framework.

Although the embodiment of FIG. 9 shows a slave device 920, a master device may be implemented in a similar manner. For example, a master device may include a similar set of processors, memory, storage device and network interface. The storage device may store parameter data for the first version of the neural network model and the memory may store computer program code configured to implement a distributed training operation, either in the form of binary code from a binary executable or in the form of other executable computer program code. The master device may use the network interface to communicate with one or more slave devices. The at least one processor of the master device may be configured to execute computer program code stored in memory to perform one or more operations. These operations may include: generating first configuration data for the neural network model based on the first version of the neural network model; sending, via the network interface, the first configuration data to the slave device 920; receiving, via the network interface, second configuration data 990 for the neural network model from the slave device; and updating the parameter data for the first version of the neural network model based on the second configuration data. These operations for one or more of the master device and the slave device may be defined via instructions (i.e. computer program code) stored within a non-transitory computer-readable storage medium.

Methods of Distributed Training

Figure 10:
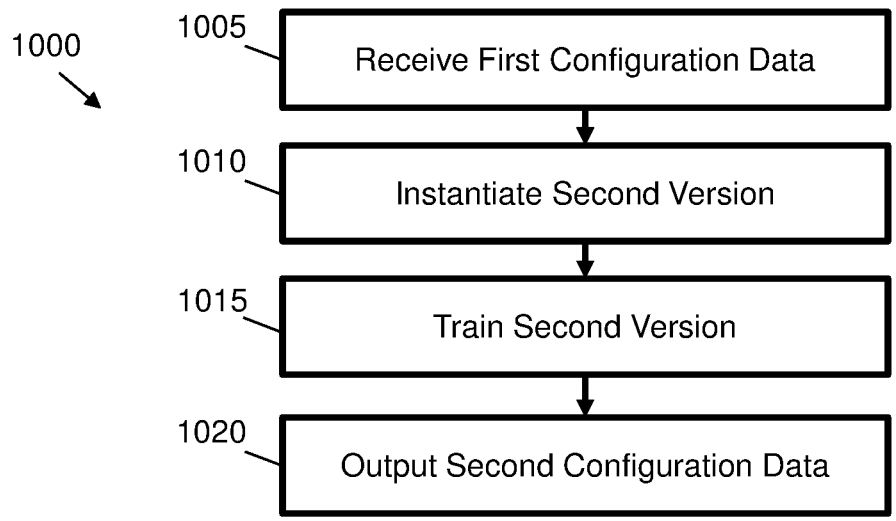
FIG. 10 shows a flow diagram showing a method of training a neural network model performed by a slave device according to various aspects of the invention.
Figure 11:
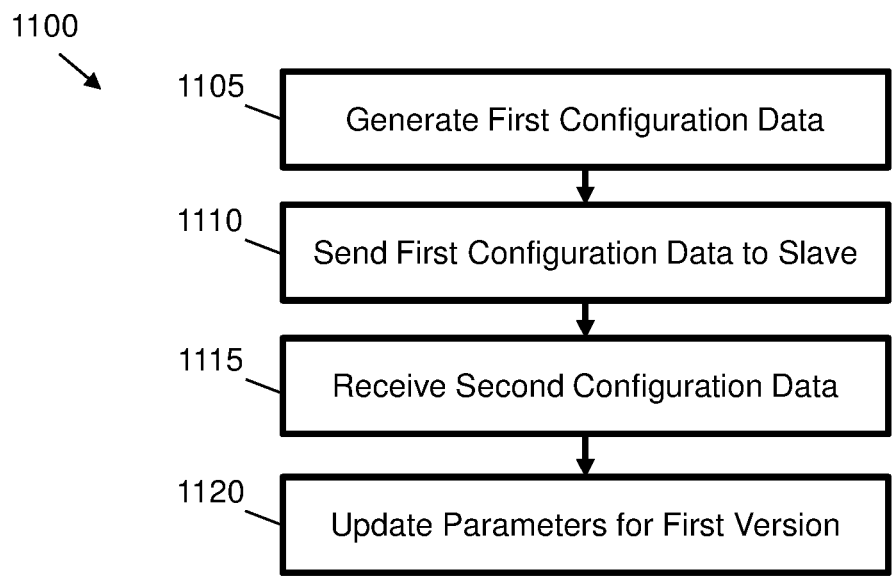
FIG. 11 shows a flow diagram showing a method of training a neural network model performed by a master device according to various aspects of the invention.

Referring now to FIGS. 10 and 11, process 1000 and process 1100 are shown in accordance with various aspects of the invention for the distributed training of a neural network model. FIG. 10 shows the process 1000 for training a neural network model that may be performed at a slave device. For example, the process 1000 may be implemented by any of the slave devices 120, 220, 320, 620, 720 etc. At step 1005, the process includes receiving, at the slave device, first configuration data for the neural network model from a master device. The master device may be remote from the slave device as described herein and the master device is associated with a first version of the neural network model. At step 1010, the slave device instantiates a second version of the neural network model using the first configuration data. As described herein, this second version may include a copy of the first version of the neural network model and/or a version of the neural network model designed for the slave devices. At step 1015, the slave device trains the second version of the neural network model using data from a first data source. The first data source may be inaccessible by the master device as described herein. At step 1020, the slave device outputs second configuration data for the neural network model based on the trained second version of the neural network model. The master device is then able to use the second configuration data to update parameters for the first version of the neural network model In one case, the instantiating at step 1010 includes instantiating, at the slave device, the second version of the neural network model as a student model and instantiating, at the slave device, the first version of the neural network as a teacher model. In this case, training includes, at the slave device, using the teacher model to train the student model. The second configuration data may then include parameters for the trained student model. This approach is illustrated in FIGS. 4A and 4B. In this case, the first configuration data may include parameters for the first version of the neural network model and a neural network architecture definition for the second version of the neural network model. The neural network architecture may define the structure of the second version of the neural network model, such as a number and type of layers and/or nodes. Parameters may include weight and/or bias values as described above. The student model and the teacher model may be instantiated using at least the parameters for the first version of the neural network model such that the second version of the neural network model includes a copy of the first version of the neural network model. During training the parameters of the teacher model are fixed and the parameters of the student model are trainable.

In another case, the first configuration data includes parameters for the first version of the neural network model and the second version of the neural network includes a trainable copy of the first version of the neural network model that is instantiated using the parameters for the first version of the neural network model. In this case, the second configuration data may include gradient data that is generated during the training. This approach is illustrated in FIG. 6.

The method may include, loading, at the slave device, a binary executable. For example, this approach is shown in FIG. 9. The method may then include executing, using at least one processor of the slave device, the binary executable to implement at least the instantiating, training and outputting steps. In certain cases, the binary executable includes the first configuration data.

Referring now to FIG. 11, the method 1100 is shown for training a neural network model that may be implemented at a master device. The method 1100 may be implemented together with the method 1000 of FIG. 10.

At step 1105, the method includes generating, at the master device, first configuration data for the neural network model based on a first version of the neural network model. This may include packaging a set of parameters for the neural network model, and in certain cases, also packaging a set of hyperparameter values. At step 1110, the first configuration data is sent from the master device to a slave device. The slave device, following step 1110 at the master device, may perform the method 1000 of FIG. 10.

At step 1115 of FIG. 11, the master device receives second configuration data for the neural network model from the slave device. This may include second configuration data output at step 1020 of FIG. 10. The second configuration data is based on a second version of the neural network model instantiated at the slave device and is generated at the slave device following training on data from the first data source. At step 1120, the master device updates parameters for the first version of the neural network model based on the second configuration data. This may be performed as described with reference to the previous examples.

In one case, the second configuration data includes parameters for the second version of the neural network model following training. In this case, the updating at step 1120 may include: instantiating the second version of the neural network model as a teacher model using the second configuration data, instantiating the first version of the neural network model as a student model, and training the student model using the teacher model to update the parameters for the first version of the neural network model. This approach is described with reference to FIG. 5. In this case, the receiving may include receiving second configuration data from a plurality of slave devices, e.g. as shown in FIG. 7 or FIGS. 8A to 8C. The updating at step 1120 may then include instantiating an ensemble of second versions of the neural network model as an ensemble of teacher models and using the ensemble of teacher models to train the student model. This is illustrated by the dotted lines in FIG. 5.

In another case, the first configuration data includes parameters for the first version of the neural network model and the second configuration data includes gradient data and the updating includes using the gradient data to update the parameters of the first version of the neural network model. This is illustrated in FIG. 6.

In one case, the method may include training, at the master device, the first version of the neural network model using data from a second data source, the second data source being inaccessible by the slave device. This is illustrated in FIG. 2.

The methods described above may be iterated to tune the parameters of the first and second versions of the neural network model, e.g. to iteratively improve both versions of the neural network model. This may be performed with data sources located at one or both devices.

Sequence Example

Figure 12:
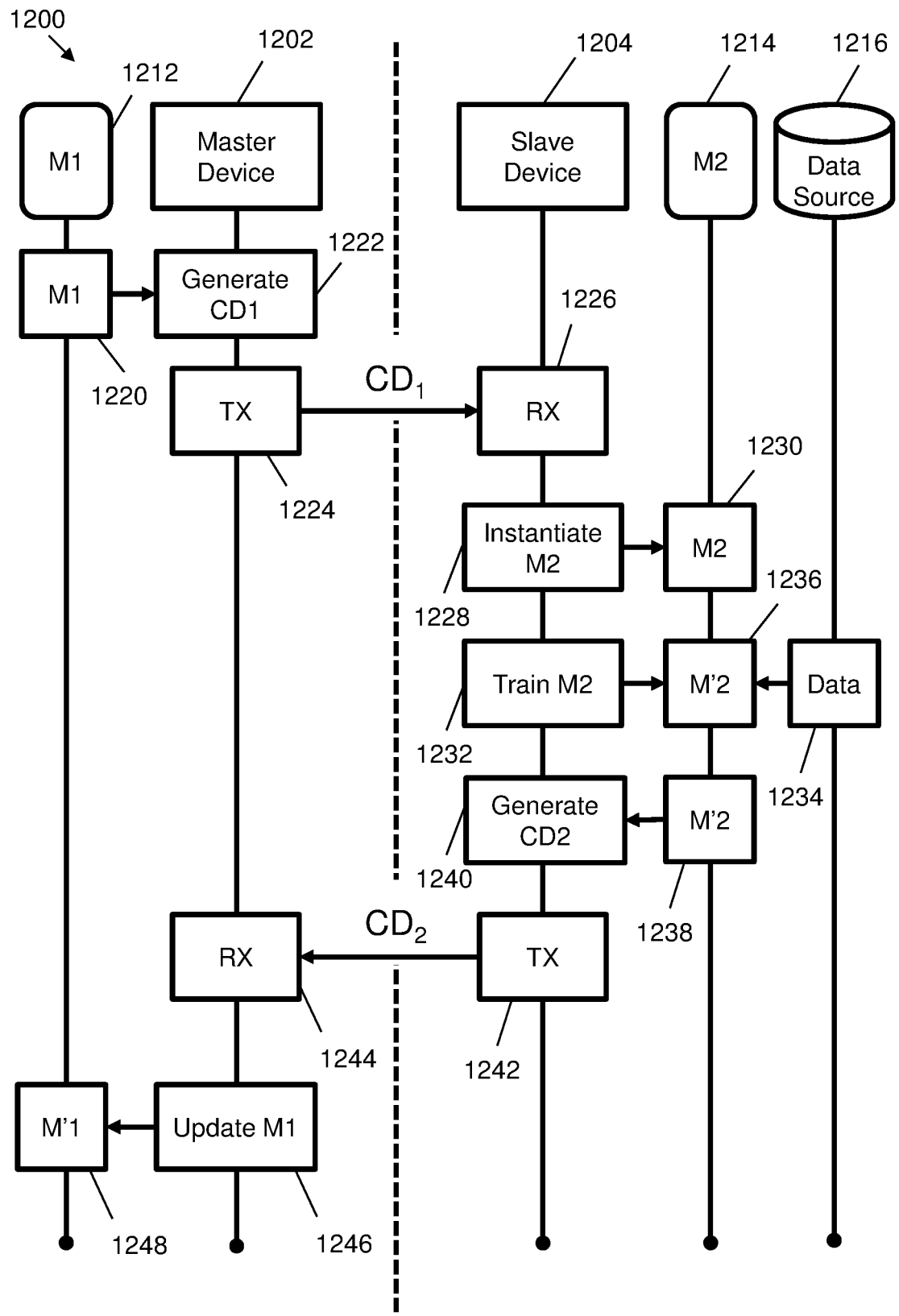
FIG. 12 shows a sequence diagram showing communications between components of a distributed training system according to various aspects of the invention.

Referring now to FIG. 12, a sequence diagram 1200 shows an example method of distributed training in accordance with the various aspects and embodiment of the invention. Five example entities are shown: a master device 1202, a slave device 1204, a first version of a neural network model 1212, a second version of the neural network model 1214 and a data source 1216. The dotted line illustrates separation, in accordance with some embodiments and aspects of the invention, between the components. The master device 1202 has access to parameters and instantiations of the first version of the neural network model 1212 whereas the slave device 1204 has access to parameters and instantiations of the second version of the neural network model 1214 and data within the data source 1216. The master device 1202 and the slave device 1204 may be configured as per any of the previous examples.

The sequence beings with the first version of the neural network model 1212 being in a first state M1 as shown at 1220. The first state M1 may be a particular configuration of weight and bias values for the neural network model. As such, the first state may relate to a first instantiation of the first version of the neural network model. At block 1222, the master device 1202 generates first configuration data CD1 using the first state M1. This may include obtaining the particular configuration of weight and bias values for the first state M1 and packaging this for transmission. At block 1224, the first configuration data CD1 is transmitted to the slave device 1204, and is received by the slave device 1204 at block 1226. Following receipt, the slave device 1204 instantiates the second version of the neural network as indicated by block 1228. As described in previous examples, the instantiated second version of the neural network may include a copy of the neural network model and/or a neural network configuration that implements the neural network model but that differs from the first version of the neural network model. At block 1232, the slave device 1204 trains the instantiated second version of the neural network model. This includes accessing training data stored on the data source 1216 as shown at block 1234. Training updates the instantiated second version of the neural network model from a first state M2 to an updated state M'2. This is illustrated in block 1236. This may include adjusting weight and bias values to generate an updated set of values. After training is completed, as illustrated by block 1238, the slave device 1204 generates second configuration data at block 1240 using the updated state M'2 of the instantiated second version of the neural network model. At block 1242, the second configuration data is transmitted to the master device 1202, where it is received at block 1244. The master device 1202 then uses the contents of the second configuration data to update the first version of the neural network model 1212 at block 1246. This may include updating the particular configuration of weight and bias values for the neural network model as illustrated by the first state M1 to generate an update state M'1 as shown by block 1248. The first version of the neural network model 1212 accessible to the master device 1202 is thus updated with a revised configuration of weight and bias values in response to the training at the slave device 1204. The updating may be performed as described with reference to previous examples.

Additional Variations

In certain embodiments and aspects in the examples above, the exchange of configuration data may be automated. This may be performed by providing an application programming interface on the master device and then having executable computer program code make calls to this interface during the execution of the above-described examples. In one case, a binary executable supplied to one or more slave devices may be configured to make calls to the interface to implement the configuration data exchange. The application programming interface may be implemented as part of a master device server process.

In certain embodiments and aspects, to avoid overfitting, the data processed by one or more of the slave and master devices may be divided into batches. Each batch may be used in a single iteration until all batches have been consumed. The data may be randomized (e.g. the order of samples may be shuffled or scrambled) between batches before running each epoch (where an epoch relates to a particular period of training, typically one that completes a predefined number of passes through the data).

In speech recognition embodiments, the neural network model may include an acoustic model. In this case, the slave device may have proprietary voice data. The master device may have acoustic model training functions and also might have proprietary voice data. In this embodiment, a cost or loss function may be based on a word error rate when a version of the neural network model is trained on a slave training data set. For speech recognition applications, the slave device may perform phoneme alignment on slave data as well as noise mixing or other forms of audio data conditioning. In certain cases, these pre-processing operations may be performed using the aforementioned binary executable. This may reduce a need for an audio processing engineer at the slave device to perform these tasks, and the slave device may remain relatively "dumb" (e.g. the master device may belong to an audio engineering entity but the slave device may not have audio engineering personnel). The binary executable and/or the first configuration data may enable the training data to be prepared appropriately for training. In certain embodiments, as part of or in addition to the first configuration data, the master device may communicate conditioning data to the slave device. For acoustic model training in automatic speech recognition, this could be recordings of specific kinds of noise. The binary executable at the slave device may be configured to apply the conditioning data to the training data. The binary executable (or other processing entity) at the slave device may also apply conditioning data that is only accessible to the slave device. This could be noise recordings, particular audio distortion, or other attributes of the transfer function from audio to digital data.

In certain embodiments, the slave device can choose to, at any time, use an instance of the second version of the neural network model for inference. Inference may be performed at the slave device or the slave device may distribute the neural network model to one or more local devices. In certain embodiments, the slave device may arrange for the second version of the neural network model to be incorporated into additional products or devices, including embedded devices such as automobiles, appliances, mobile devices, or automated call centers. Inference may also be performed at the master device using an available instance of the first version of the neural network model. In certain embodiments, a training process runs to completion through a specific number of iterations and epochs to create a final trained first version of the neural network model at the master device.

In certain embodiments, an instance of the first version of the neural network model at the master device may be used to provide an "inference service" to one or more devices, including one or more of the slave devices. For example, the first version of the neural network model may be a larger or more accurate model. It might even be too large to perform inference in real-time within reasonable computing resource budgets. In other examples, the master device may provide a copy of the first version of the neural network model (e.g. final first configuration data) for use in production applications, such as embedded devices manufactured by each slave-device-controlling entity. In other embodiments, the slave device may provide a service to the master device, e.g. in the form of training on restricted data. In these embodiments, the slave device may not require a final trained version of the neural network model.

Example Implementations

Certain examples described herein may be applied to speech processing including automatic speech recognition. The neural network model described herein may relate to one or more of an acoustic model, a pronunciation model and a language model in a speech processing system (e.g. so called "linguistic models"). In these embodiments, the improvements obtained using the distributed trained examples may improve an accuracy and a robustness of speech processing by using information derived from private voice data across one or more devices.

Certain methods and sets of operations as described herein may be performed by instructions that are stored upon a non-transitory computer readable medium. The non-transitory computer readable medium stores code comprising instructions that, if executed by one or more computers, would cause the computer to perform steps of methods described herein. The non-transitory computer readable medium may include one or more of a rotating magnetic disk, a rotating optical disk, a flash random access memory (RAM) chip, and other mechanically moving or solid-state storage media.

Certain embodiments have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of humans and machines. Method examples are complete wherever in the world most constituent steps occur. Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof.

Practitioners skilled in the art will recognize many possible modifications and variations. The modifications and variations include any relevant combination of the disclosed features. Descriptions herein reciting principles, aspects, and examples encompass both structural and functional equivalents thereof. Elements described herein as "coupled" or "communicatively coupled" have an effectual relationship realizable by a direct connection or indirect connection, which uses one or more other intervening elements. Examples described herein as "communicating" or "in communication with" another device, module, or elements include any form of communication or link. For example, a communication link may be established using a wired connection, wireless protocols, near-field protocols, or RFID.

The scope of the invention, therefore, is not intended to be limited to the examples shown and described herein. Rather, the scope and spirit of present invention is embodied by the appended claims.

What is claimed is:

1. A method of training a neural network model, the method comprising:
   receiving, at a slave device, first configuration data for the neural network model from a master device, the master device being remote from the slave device, the master device including a first version of the neural network model;
   instantiating, at the slave device, a second version of the neural network model using the first configuration data;
   training, at the slave device, the second version of the neural network model using data from a first data source, the first data source being inaccessible by the master device;
   receiving, at the master device, second configuration data for the neural network model, from the slave device, based on the trained second version of the neural network model;
   instantiating, at the slave device, the second version of the neural network model as a student model;
   instantiating, at the slave device, the first version of the neural network as a teacher model;
   using, at the slave device, the teacher model to train the student model; and
   generating the second configuration data to include parameters for the trained student model,
   wherein the master device is configured to use the second configuration data to update parameters for the first version of the neural network model, and wherein the first configuration data includes parameters for the first version of the neural network model and a neural network architecture definition for the second version of the neural network model.

2. The method of claim 1 further comprising:
loading, at the slave device, a binary executable; and
executing, using at least one processor of the slave device, the binary executable to implement at least the instantiating, training and outputting steps.

3. The method of claim 2, wherein the binary executable includes the first configuration data.

4. A method of training a neural network model, the method comprising:
receiving, at a slave device, first configuration data for the neural network model from a master device, the master device being remote from the slave device, the master device including a first version of the neural network model;
instantiating, at the slave device, a second version of the neural network model using the first configuration data;
training, at the slave device, the second version of the neural network model using data from a first data source, the first data source being inaccessible by the master device;
receiving, at the master device, second configuration data for the neural network model, from the slave device, based on the trained second version of the neural network model;
instantiating, at the slave device, the second version of the neural network model as a student model;
instantiating, at the slave device, the first version of the neural network as a teacher model;
using, at the slave device, the teacher model to train the student model; and
generating the second configuration data to include parameters for the trained student model,
wherein the master device is configured to use the second configuration data to update parameters for the first version of the neural network model, and
wherein the first configuration data includes parameters for the first version of the neural network model and further comprising:
instantiating the student model and the teacher model using the parameters for the first version of the neural network model, such that the second version of the neural network model includes a copy of the first version of the neural network model; and
fixing, during training, the parameters of the teacher model while the parameters of the student model are trainable.

5. A method of training a neural network model, the method comprising:
receiving, at a slave device, first configuration data for the neural network model from a master device, the master device being remote from the slave device, the master device including a first version of the neural network model;
instantiating, at the slave device, a second version of the neural network model using the first configuration data;
training, at the slave device, the second version of the neural network model using data from a first data source, the first data source being inaccessible by the master device; and
receiving, at the master device, second configuration data for the neural network model, from the slave device, based on the trained second version of the neural network model, wherein the master device is configured to use the second configuration data to update parameters for the first version of the neural network model,
wherein the first configuration data includes parameters for the first version of the neural network model and further comprising:
instantiating, using the parameters for the first version of the neural network model, the second version of the neural network that includes a trainable copy of the first version of the neural network model; and
generating, during the training, gradient data that is included in the second configuration data, and
wherein the master device is configured to update parameters for the first version of the neural network model by scaling its parameters by amounts indicated by the gradient data.

6. A slave device comprising:
a storage device to store parameter data for a second version of a neural network model;
memory to store computer program code configured to implement a distributed training operation;
a network interface to communicate data with a master device, the master device being remote and including a first version of the neural network model;
a storage interface to communicate with a first data source, the first data source being inaccessible by the master device; and
at least one processor configured to execute the computer program code stored in memory to:
receive, via the network interface, first configuration data for the neural network model from the master device;
instantiate the second version of the neural network model using the first configuration data;
perform a training operation to train the second version of the neural network model using data from the first data source obtained via the storage interface;
update the parameter data in the storage device based on the training operation;
output, via the network interface, second configuration data for the neural network model based on data resulting from the training operation;
instantiate the second version of the neural network model as a student model;
instantiate the first version of the neural network as a teacher model;
use the teacher model to train the student model; and
generate the second configuration data to include parameters for the trained student model,
wherein the second configuration data is used to update parameter data for the first version of the neural network model, and
wherein the first configuration data includes parameters for the first version of the neural network model and a neural network architecture definition for the second version of the neural network model.

7. The slave device of claim 6, wherein the at least one processor further executes the computer program code in memory to:
load, at the slave device, a binary executable; and
execute, at the slave device, the binary executable to implement at least the instantiate of the second version of the neural network model using the first configuration data, to perform the training operation, and output.

8. The slave device of claim 7, wherein the binary executable includes the first configuration data.

9. A slave device comprising:
a storage device to store parameter data for a second version of a neural network model;
memory to store computer program code configured to implement a distributed training operation;
a network interface to communicate data with a master device, the master device being remote and including a first version of the neural network model;
a storage interface to communicate with a first data source, the first data source being inaccessible by the master device; and
at least one processor configured to execute the computer program code stored in memory to:
receive, via the network interface, first configuration data for the neural network model from the master device;
instantiate the second version of the neural network model using the first configuration data;
perform a training operation to train the second version of the neural network model using data from the first data source obtained via the storage interface;
update the parameter data in the storage device based on the training operation;
output, via the network interface, second configuration data for the neural network model based on data resulting from the training operation;
instantiate the second version of the neural network model as a student model;
instantiate the first version of the neural network as a teacher model;
use the teacher model to train the student model; and
generate the second configuration data to include parameters for the trained student model,
wherein the second configuration data is used to update parameter data for the first version of the neural network model, and
wherein the first configuration data includes parameters for the first version of the neural network model and the at least one processor further executes the computer program code in memory to:
instantiate the student model and the teacher model using the parameters for the first version of the neural network model, such that the second version of the neural network model includes a copy of the first version of the neural network model; and
fix, during training, the parameters of the teacher model while the parameters of the student model are trainable.

10. The slave device of claim 9, wherein the at least one processor further executes the computer program code in memory to:
load, at the slave device, a binary executable; and
execute, at the slave device, the binary executable to implement at least the instantiate of the second version of the neural network model using the first configuration data, to perform the training operation, and output.

11. The slave device of claim 10, wherein the binary executable includes the first configuration data.

12. A slave device comprising:
a storage device to store parameter data for a second version of a neural network model;
memory to store computer program code configured to implement a distributed training operation;
a network interface to communicate data with a master device, the master device being remote and including a first version of the neural network model;
a storage interface to communicate with a first data source, the first data source being inaccessible by the master device; and
at least one processor configured to execute the computer program code stored in memory to:
receive, via the network interface, first configuration data for the neural network model from the master device;
instantiate the second version of the neural network model using the first configuration data;
perform a training operation to train the second version of the neural network model using data from the first data source obtained via the storage interface;
update the parameter data in the storage device based on the training operation; and
output, via the network interface, second configuration data for the neural network model based on data resulting from the training operation,
wherein the second configuration data is used to update parameter data for the first version of the neural network model, and
wherein the first configuration data includes parameters for the first version of the neural network model and the at least one processor further executes the computer program code in memory to:
instantiate, using the parameters for the first version of the neural network model, the second version of the neural network that includes a trainable copy of the first version of the neural network model; and
generate, during the training, gradient data that is included in the second configuration data, wherein the master device is configured to update parameters for the first version of the neural network model by scaling its parameters by amounts indicated by the gradient data.

13. The slave device of claim 12, wherein the at least one processor further executes the computer program code in memory to:
load, at the slave device, a binary executable; and
execute, at the slave device, the binary executable to implement at least the instantiate of the second version of the neural network model using the first configuration data, to perform the training operation, and output.

14. The slave device of claim 13, wherein the binary executable includes the first configuration data.

* * * * *